US011054267B2

(12) United States Patent
Katami et al.

(10) Patent No.: US 11,054,267 B2
(45) Date of Patent: Jul. 6, 2021

(54) GUIDANCE APPARATUS, GUIDANCE METHOD, AND GUIDANCE PROGRAM

(71) Applicant: JVC KENWOOD Corporation, Yokohama (JP)

(72) Inventors: Kenji Katami, Yokohama (JP); Ichiro Shishido, Yokohama (JP); Masaaki Ogishita, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 112 days.

(21) Appl. No.: 16/103,140

(22) Filed: Aug. 14, 2018

(65) Prior Publication Data

US 2019/0049254 A1   Feb. 14, 2019

(30) Foreign Application Priority Data

Aug. 14, 2017   (JP) .............................. JP2017-156373

(51) Int. Cl.
*G01C 21/34*   (2006.01)
*G01C 21/36*   (2006.01)
*G01C 21/20*   (2006.01)

(52) U.S. Cl.
CPC ......... *G01C 21/3415* (2013.01); *G01C 21/20* (2013.01); *G01C 21/3626* (2013.01)

(58) Field of Classification Search
CPC . G01C 21/3415; G01C 21/20; G01C 21/3626
USPC ......................................................... 701/411
See application file for complete search history.

(56) References Cited

U.S. PATENT DOCUMENTS

| 6,047,235 A * | 4/2000 | Hiyokawa | G06Q 20/20 |
| | | | 701/411 |
| 2004/0220729 A1* | 11/2004 | Park | G01C 21/3415 |
| | | | 701/410 |
| 2009/0030600 A1* | 1/2009 | Liu | G01C 21/3415 |
| | | | 701/533 |
| 2009/0234577 A1* | 9/2009 | Rinscheid | G01C 21/3415 |
| | | | 701/533 |
| 2010/0324817 A1* | 12/2010 | Hansen | G01C 21/3632 |
| | | | 701/414 |
| 2012/0143492 A1* | 6/2012 | Johnson | G01C 21/3415 |
| | | | 701/411 |

(Continued)

FOREIGN PATENT DOCUMENTS

| JP | 2001-165679 A | 6/2001 |
| JP | 2012-078193 A | 4/2012 |
| JP | 2016-510873 A | 4/2016 |

*Primary Examiner* — Krishnan Ramesh
(74) *Attorney, Agent, or Firm* — Procopio, Cory, Hargreaves & Savitch LLP

(57) ABSTRACT

A guidance apparatus, a guidance method, and a guidance program for safely guiding a user to a point deviated from a proper route when the user has deviated from the proper route. A guidance apparatus according to an embodiment includes: a positional information measurement unit configured to sequentially measure a position of the guidance apparatus; a controller configured to determine whether the position measured by the positional information measurement unit is a position on a proper route and generate first guidance information for guiding a user from a guidance start point, which is a point determined not to be a position on the proper route, to a first deviation point, which is one point determined to be a position on the proper route.

9 Claims, 16 Drawing Sheets

(56) References Cited

U.S. PATENT DOCUMENTS

| | | | | |
|---|---|---|---|---|
| 2013/0147820 A1* | 6/2013 | Kalai | ............... | G01C 21/32 |
| | | | | 345/522 |
| 2015/0362328 A1 | 12/2015 | Li et al. | | |
| 2016/0093208 A1* | 3/2016 | Duan | ............... | G01C 21/26 |
| | | | | 701/117 |
| 2017/0082453 A1* | 3/2017 | Fischer | ............ | G01C 21/3626 |
| 2017/0276496 A1* | 9/2017 | Mannami | ............ | G01C 21/20 |
| 2018/0023967 A1* | 1/2018 | Mazzella | .......... | G01C 21/3438 |
| | | | | 701/411 |
| 2018/0237012 A1* | 8/2018 | Jammoussi | ........ | G05D 1/0088 |

* cited by examiner

GUIDANCE APPARATUS, GUIDANCE METHOD, AND GUIDANCE PROGRAM

CROSS REFERENCE TO RELATED APPLICATION

This application is based upon and claims the benefit of priority from Japanese patent application No. 2017-156373, filed on Aug. 14, 2017, the disclosure of which is incorporated herein in its entirety by reference.

BACKGROUND

The present disclosure relates to a guidance apparatus, a guidance method, and a guidance program.

Japanese Unexamined Patent Application Publication No. 2001-165679 discloses a technique related to a portable route guidance apparatus for performing route guidance of a return path to cause a user to return to a departure place by tracking back an outward way. In particular, according to the technique disclosed in Japanese Unexamined Patent Application Publication No. 2001-165679, every corner of the path from the departure place to the destination is detected as a node while the user proceeds along the path. Then the distance between the passing points and the directions thereof are stored in a route table based on coordinate values of the previous node and coordinate values of the current node. Next, the return path and the current position are displayed on a device screen based on the coordinates of the nodes stored in the route table or the like when the user tries to go back to the departure place from the destination by tracking back the path the user has passed so far. When the distance between the current position and the return path that is the closest to the current position (the length of the perpendicular line drawn from the current position to the return path) is a predetermined value or larger, it is determined that the current position is deviated from the return path and a warning sound is issued. At the same time, the previous node and the current position are connected by a dashed line and displayed so that the user can know how much the current position is deviated from the return path.

SUMMARY

However, there is a problem in Japanese Unexamined Patent Application Publication No. 2001-165679 that the route guidance cannot be sufficiently provided when the user returns to the proper route (return path) after the user is deviated from the proper route. According to Japanese Unexamined Patent Application Publication No. 2001-165679, only information indicating how much the current position is deviated from the proper route is indicated (FIG. 7(b) of Japanese Unexamined Patent Application Publication No. 2001-165679). However, there may be various routes to return to the proper route. When, for example, the user tries to return to the proper route by the shortest distance, it is possible that the user may linearly proceed to a point on the proper route that is the closest from the current position. However, in a mountain, a jungle or the like, the shortest distance on the plane may not be a safe path. Further, even when the user goes back to the point deviated from the proper route, there are various paths that the user may take. Above all, there is no guarantee that the user that has deviated from the proper route is able to accurately return to the deviation point. Therefore, Japanese Unexamined Patent Application Publication No. 2001-165679 does not guide the user to the safe return route that leads to the proper route.

A guidance apparatus according to one aspect of the present embodiment includes: at least one processor; a positional information measurement unit configured to sequentially measure a position of the guidance apparatus; at least one memory coupled to the processor, the memory storing instructions that when executed by the processor cause the processor to: determine whether the position measured by the positional information measurement unit is a position on a proper route and generate first guidance information for guiding a user from a guidance start point, which is a point determined not to be a position on the proper route, to a first deviation point, which is one point determined to be a position on the proper route.

A guidance method that guides a user to a proper route using a guidance apparatus according to one aspect of the present embodiment, the guidance method includes: sequentially measuring, by the guidance apparatus, a position of the guidance apparatus; determining, by the guidance apparatus, whether the measured position is a position on a proper route; and generating, by the guidance apparatus, first guidance information for guiding a user from a guidance start point, which is a point determined not to be a position on the proper route, to a first deviation point, which is one point determined to be a position on the proper route.

A non-transitory computer readable medium storing a guidance program according to one aspect of the present embodiment for causing a computer to execute the following processing of: sequentially acquiring a position of the computer; determining whether the acquired position is a position on a proper route; and generating first guidance information for guiding a user from a guidance start point, which is a point determined not to be a position on the proper route, to a first deviation point, which is one point determined to be a position on the proper route.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Hereinafter, with reference to the drawings, specific embodiments of the present disclosure will be explained in detail. Throughout the drawings, the same elements are denoted by the same reference symbols, and overlapping descriptions are omitted as appropriate for the sake of clarity of the description.

First Embodiment

<Configuration Example of Guidance Apparatus>

Figure 1:
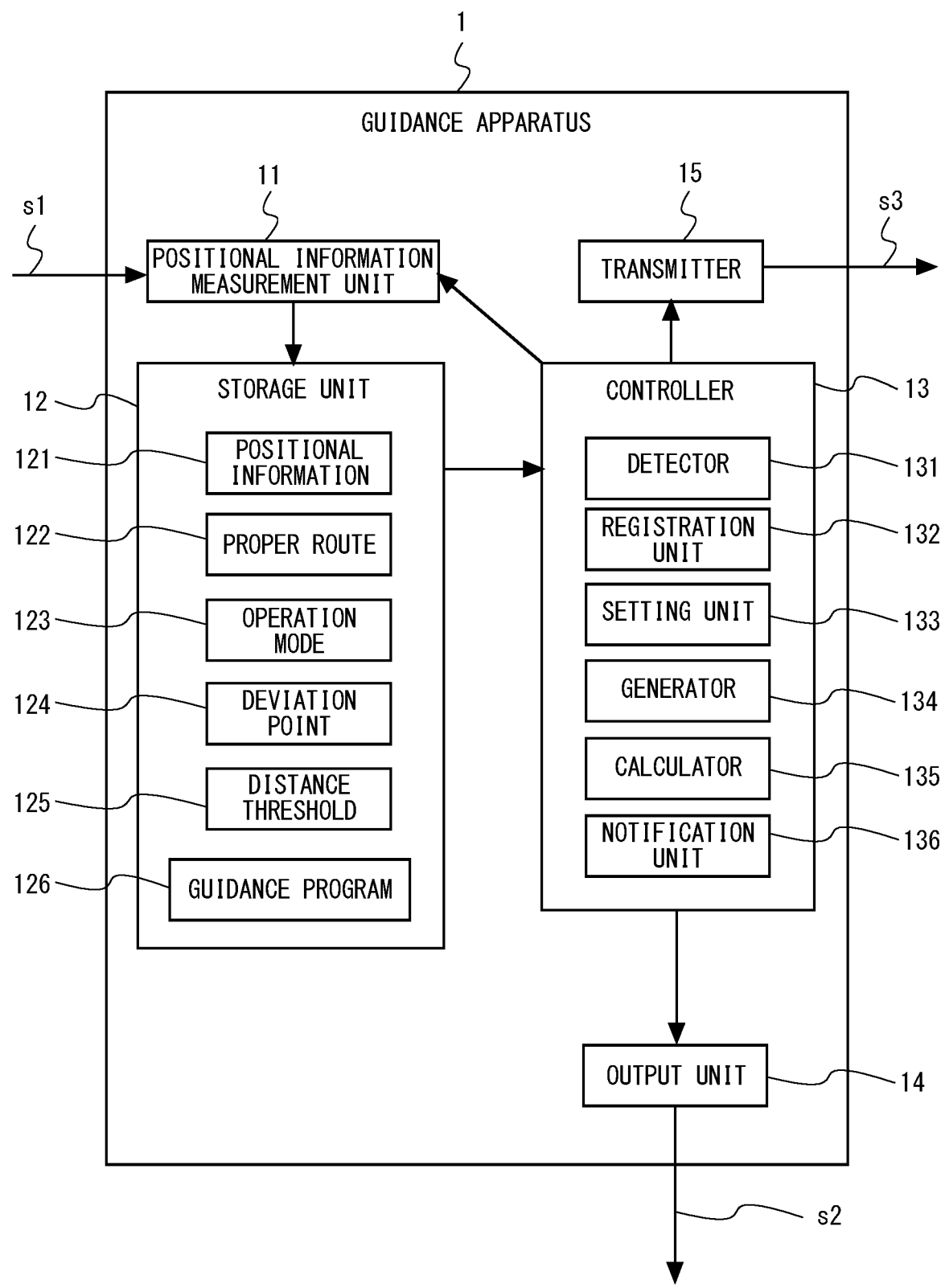
FIG. 1 is a block diagram showing a configuration of a guidance apparatus according to a first embodiment of the present disclosure.

FIG. 1 is a block diagram showing a configuration of a guidance apparatus 1 according to a first embodiment of the present disclosure. The guidance apparatus 1 is a communication terminal used by a person to be guided, that is, a user. The user carries the guidance apparatus 1 and moves from a predetermined departure place to a destination along a proper route that is known in advance. It is assumed that the user walks, for example, through a mountain, a jungle or the like. The guidance apparatus 1 is an apparatus that guides the user to the proper route safely when the user is deviated from the proper route.

The guidance apparatus 1 includes a positional information measurement unit 11, a storage unit 12, a controller 13, an output unit 14, and a transmitter 15. The positional information measurement unit 11 receives a Global Positioning System (GPS) signal s1 at predetermined measurement timings, converts each GPS signal that has been received into positional information 121 indicating the position, and outputs the positional information 121 to the storage unit 12. That is, the positional information measurement unit 11 sequentially measures the position indicating the current position of itself (guidance apparatus 1). It can also be said that the positional information measurement unit 11 periodically measures the position of the guidance apparatus 1. Accordingly, the storage unit 12 stores information regarding a plurality of positions (that is, "measurement positions") of the guidance apparatus 1 measured at a plurality of different measurement timings. The plurality of measurement positions are stored, for example, in the order of the measurement timings and are acquired by the controller 13 while keeping this order. The cycle of the measurement (measurement interval) may either be constant or be varied. The measurement interval is, for example, every ten seconds, but is not limited thereto. The plurality of measurement positions are stored in the order of the measurement timings and are acquired sequentially by the controller 13 while keeping this order. Alternatively, the date and time or the time and the positional information may be stored in the storage unit 12 while they are associated with each other. Note that the positional information indicating the current position of the guidance apparatus 1 may be specified based on not only the GPS signals but information on a base station of a mobile phone or information on a base station of wireless LAN.

The storage unit 12 is a storage apparatus that stores the positional information 121, a proper route 122, an operation mode 123, a deviation point 124, a distance threshold 125, and a guidance program 126. As described above, the positional information 121, which is information converted from the GPS signal s1, includes, for example, latitude and longitude, and is expressed by two-dimensional coordinates. Further, the positional information measurement unit 11 may measure altitude. In this case, the positional information may include the altitude. However, the positional information 121 is not limited to the aforementioned one and may be any kind of information indicating the current position of the guidance apparatus 1 at the time of the measurement. Further, in the following description, the "current position" indicates the latest one of the pieces of positional information 121 stored in the storage unit 12. That is, it is assumed that the "current position" is the positional information last acquired by the positional information measurement unit 11.

The proper route 122 is a set of positional information that the user passes to reach the destination from the predetermined departure place. It is sufficient, however, that the proper route 122 at least include representative positional information on the path. The operation mode 123 is information indicating an operation state of the guidance apparatus 1. The operation mode 123 may include, for example, a "normal mode", a "monitor mode", a "guidance mode" and an "emergency mode".

The "normal mode" indicates a state in which the guidance apparatus 1 is moving along the proper route 122 to some extent and guidance processing according to this embodiment is not executed. Further, the "normal mode" may be a state in which a general function for navigating the user to the proper route 122 is achieved.

When it is detected in the normal mode that the guidance apparatus 1 is away from the proper route 122 by a distance D2 (second distance) or larger, the normal mode is switched to the "monitor mode", which indicates a state in which monitoring of the current position of the guidance apparatus 1 is performed in detail relative to that in the "normal mode". In the "monitor mode", for example, information on the current position of the guidance apparatus 1 is kept to be acquired at a measurement interval shorter than that in the "normal mode". However, in the "monitor mode", a notification indicating that the guidance apparatus 1 is deviated from the proper route 122 may not be sent to the user.

When it is detected in the monitor mode (or the normal mode) that the guidance apparatus 1 is away from the proper route 122 by a distance D1 (first distance) or larger, the monitor mode (or the normal mode) is switched to the "guidance mode", which indicates a state in which a notification indicating that the guidance apparatus 1 has deviated from the proper route 122 is sent to the user and the user is guided to track back from the current position (guidance start point) to one point (deviation point) determined to be positioned on the proper route 122. In the "guidance mode", the user is notified of the guidance information s2 to safely guide the user from the current position to the deviation point.

When it is detected in the guidance mode that the guidance apparatus 1 has further deviated from the return route guided by the guidance information, the guidance mode is switched to the "emergency mode", which indicates a state in which another guidance information s2 is sent to the user and an emergency notification signal s3 is sent to an external apparatus.

The operation mode 123 is not limited to include the aforementioned modes. Further, it is not always necessary to use all the above-mentioned operation modes.

The deviation point 124 is positional information indicating the point where the guidance apparatus 1 has started deviation from the proper route 122 or the return route. That is, the deviation point 124 includes positional information indicating the point at which the guidance apparatus 1 has been last measured on the proper route 122 when the mode has switched to the monitor mode. Further, the deviation point 124 includes positional information indicating the point at which the guidance apparatus 1 has been last measured on the return route when the mode has switched to the guidance mode. The distance threshold 125 is a threshold, which is a reference value to detect that the current position of the guidance apparatus 1 is apart from the proper route 122 or the deviation point 124 by a predetermined distance. The distance threshold 125 at least includes distances D1, D2, and D3. The distance D1 is a threshold to make a transition from the monitor mode to the guidance mode, and is one example of the first distance. The distance D2 is a threshold to make a transition from the normal mode to the monitor mode, and is one example of the second distance. The distance D3 is a threshold to make a transition from the guidance mode or the emergency mode to the monitor mode or the normal mode, and is one example of the third distance. Further, the distances D2 and D3 are shorter than the distance D1 and the distance D2 and the distance D3 may have the same value. The guidance program 126 is a computer program on which the guidance processing according to this embodiment is implemented.

The controller 13 is an information processing apparatus including a processor, a memory and the like, that is, a computer. The controller 13 loads the guidance program 126 from the storage unit 12 and executes the loaded program. Accordingly, the controller 13 serves as a detector 131, a registration unit 132, a setting unit 133, a generator 134, a calculator 135, and a notification unit 136 that will be explained below.

The detector 131 sequentially acquires positional information measured in the positional information measurement unit 11 in the normal mode and determines whether the current position is a position on the proper route 122. Various methods may be used for determining whether the current position is a position on the proper route 122. The proper route 122 is defined to be, for example, a closed area (a combination of rectangular areas in which the latitude and the longitude satisfy a predetermined condition). When the current position is included in the closed area, it may be determined that the current position is a position on the proper route 122. When the current position is not included in the closed area, it may be determined that the current position is not a position on the proper route 122. Alternatively, the proper route 122 may be defined to be a line (center line of the route). The current position may be determined to be the position on the proper route 122 when the shortest distance between the current position and the center line is smaller than a predetermined value. This predetermined value may be set to an appropriate value in accordance with the position measurement accuracy of the positional information measurement unit 11. Alternatively, the proper route 122 may be defined to be a set of points (set of points indicating the latitude and the longitude) and the current position may be determined to be the position on the proper route 122 when the shortest distance between the current position and the points included in the set is smaller than a predetermined value.

Further, when the detector 131 determines that the current position is not a position on the proper route 122, the detector 131 determines whether the current position is away from the proper route 122 by the distance D2 (second distance) or larger. The detector 131 calculates, for example, the length of the perpendicular line drawn from the current position indicated by the positional information that has been acquired to the proper route 122 as the shortest distance and determines whether this shortest distance is the distance D2 or larger. When it is determined that the shortest distance is the distance D2 or larger, the detector 131 detects that the current position is away from the proper route 122 by the distance D2 or larger. While the determination regarding whether the current position is a position on the proper route 122 and the determination using the distance D2 (second distance) (determination regarding whether to make a transition to the monitor mode) are performed under conditions different from each other in the aforementioned description, they may be performed under the same condition. That is, when the current position is a position whose distance from the proper route 122 is smaller than the distance D2 (second distance), the current position may be determined to be the position on the proper route 122.

In this case, the setting unit 133 sets the operation mode 123 in the storage unit 12 to the monitor mode. That is, the operation mode of the guidance apparatus 1 is switched from the normal mode to the monitor mode. Further, in this case, the registration unit 132 registers one positional information 121 measured by the positional information measurement unit 11 prior to the current position, the one positional information 121 being determined to be positioned on the proper route 122, in the storage unit 12 as the deviation point 124 (first deviation point). Basically, the last point at which it is determined that the guidance apparatus 1 is positioned on the proper route is registered as the deviation point 124. In some cases, however, another point that has been determined to be a position on the proper route 122 may be registered as the deviation point 124. For example, when visibility of an area near the last point that has been determined to be a position on the proper route 122 is poor and this point is hard to find from a place slightly away from the above last point, and another point (second to last point, third to last point etc.) on the proper route 122 that the user has passed before passing the above last point is safer than the above point since visibility of an area near the other point is good, the other point may be set to be the deviation point 124. The points whose distances from the last point are smaller than a predetermined value among the points on the proper route 122 that the user has passed or the points within N points when counting from the last (N is an integer equal to or larger than two) may be candidates for the deviation point 124, and the safest point among them may be set as the deviation point 124. That is, one point that has been determined to be the position on the proper route 122 is set to be the deviation point 124.

Further, the detector 131 determines whether the current position is away from the proper route 122 by the distance D1 (first distance) or larger in the monitor mode. The detector 131 determines, for example, whether the shortest distance between the current position and the proper route 122 is equal to or larger than the distance D1. When it is determined that the shortest distance is equal to or larger than the distance D1, the detector 131 detects that the current position has been away from the proper route 122 by the distance D1 or larger.

In this case, the setting unit 133 sets the operation mode 123 in the storage unit 12 to the guidance mode. That is, the operation mode of the guidance apparatus 1 is switched from the monitor mode to the guidance mode.

Further, in this case, the generator 134 reads out the deviation point 124 from the storage unit 12 and specifies the deviation point. Then the generator 134 refers to the storage unit 12, reads out the positional information 121 recorded after the deviation point 124, and associates consecutive positional information along the time series with one another, thereby specifying the moving path when the user has actually moved from the deviation point 124 to the current position (guidance start point). Then the generator 134 generates a first return route to track back the moving path that has been specified. That is, the first return route is the guidance path from the guidance start point to the deviation point 124 in which the respective positional information pieces that the user has actually passed from the deviation point 124 to the guidance start point are associated with each other in such a way that the user passes the points in the direction opposite to the order that the user has actually passed from the deviation point 124 to the guidance start point. Further, the generator 134 generates guidance information (first guidance information) based on the current position and the first return route. The generator 134 generates, for example, information indicating the direction from the current position to the most recent position among the positional information pieces in the first return route as the guidance information. That is, the guidance information is information indicating not only the linear direction from the current position to the deviation point but also the current guidance direction from the current position to the position that the user has passed most recently. Further, the generator 134 may also include information indicating the direction for the position indicated by the positional information that the user should pass next to the most recent positional information among the positional information pieces in the first return route in the guidance information. Therefore, the generator 134 may include the whole first return route in the guidance information.

After that, the notification unit 136 notifies the user of the guidance information s2 that has been generated via the output unit 14. The output unit 14 outputs the guidance information s2 regarding which a notification has been sent from the notification unit 136 to the outside of the guidance apparatus 1. The output unit 14 is at least a part of sound output means, direction display means, image display means and the like or a combination thereof.

Figure 2:
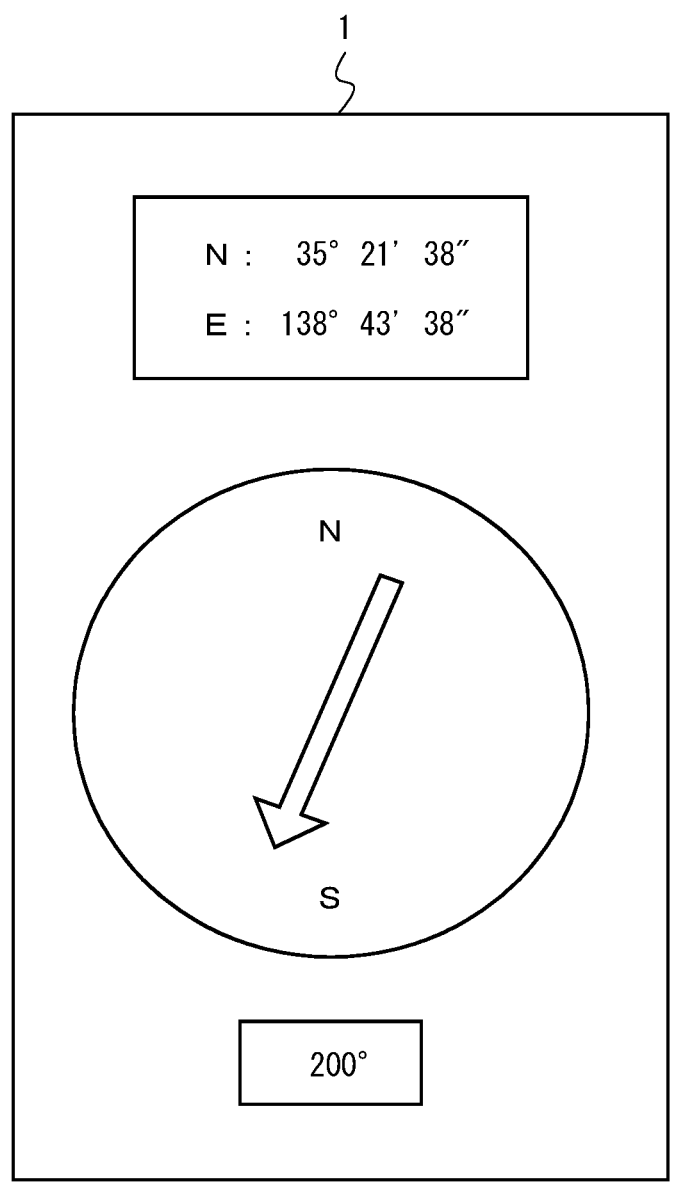
FIG. 2 is a diagram showing a notification example of guidance information by one example of direction display means according to the first embodiment of the present disclosure.

The sound output means is, for example, a speaker, and outputs the guidance information s2 which indicates the current guidance direction to move from the current position along the return route to the user using a voice or the like. It is possible to guide the user using a voice guide such as "go straight forward", "advance in the direction 45 degrees to the right", or "advance 100 meters in the direction 45 degrees to the left". Alternatively, when the current traveling direction is correct, a notification sound having a first pattern may be played. On the other hand, when the current traveling direction is not correct, a notification sound having a second pattern may be played. For example, the first pattern may be a pattern in which a sound having a first frequency is played for a first period of time and this sound is stopped for a second period of time, and the second pattern may be a pattern in which a sound having a second frequency is played for a third period of time and this sound is stopped for a fourth period of time. Further, when the right side is the correct direction based on the current traveling direction, a notification sound having a third pattern may be used. When the left side is the correct direction, a notification sound having a fourth pattern may be used. Further, the direction display means indicates, for example, the direction of the guidance direction by a physical or electronic compass or the like. FIG. 2 is a diagram showing a notification example of the guidance information by one example of the direction display means according to the first embodiment of the present disclosure. The arrow shown in FIG. 2, which is one example of the guidance information, indicates the direction in which the user should proceed.

Figure 3:
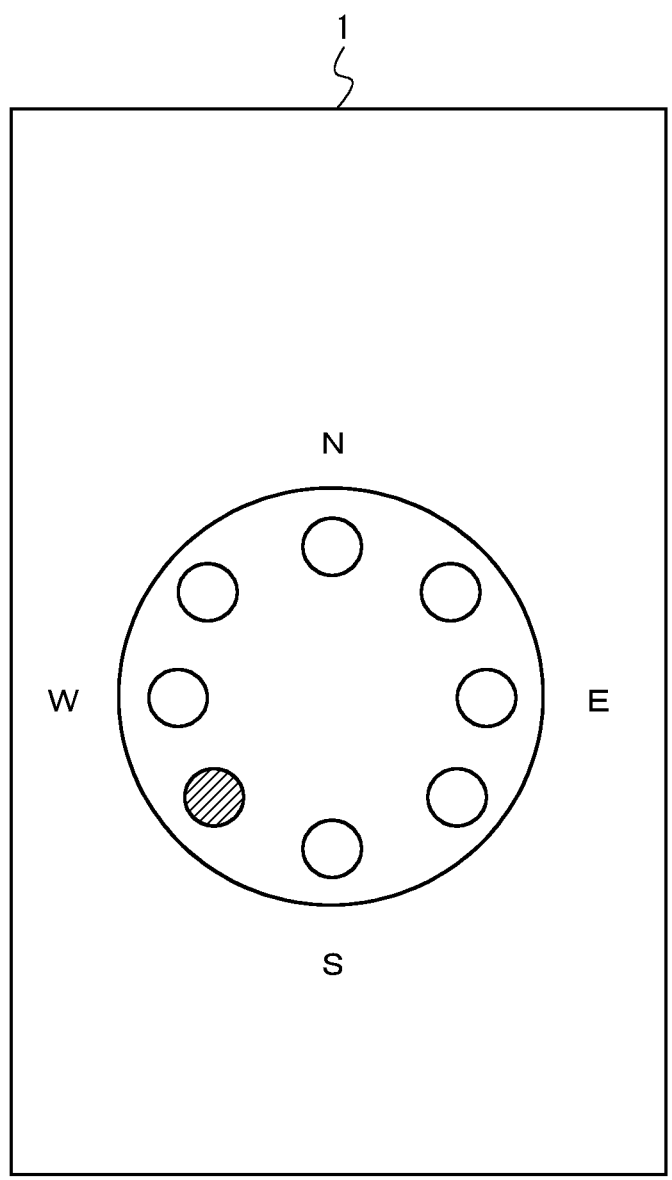
FIG. 3 is a diagram showing a notification example of the guidance information by another example of the direction display means according to the first embodiment of the present disclosure.

Alternatively, the direction display means is, for example, means for lighting some of a plurality of Light Emitting Diodes (LEDs) arranged in a ring form that correspond to the direction of the aforementioned guidance direction. FIG. 3 is a diagram showing a notification example of the guidance information by another example of the direction display means according to the first embodiment of the present disclosure.

Figure 4:
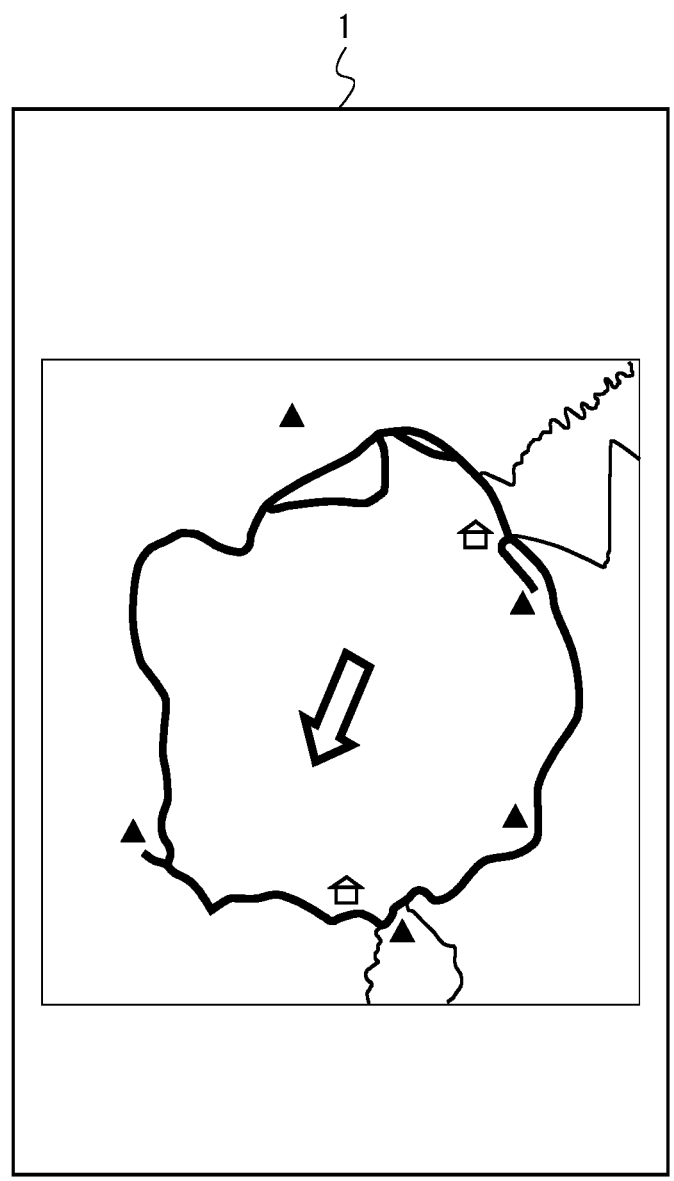
FIG. 4 is a diagram showing a notification example of the guidance information by one example of image display means according to the first embodiment of the present disclosure.

Further, the image display means is, for example, means for displaying map information on a display and displaying an arrow or the like that corresponds to the direction of the aforementioned guidance direction. FIG. 4 is a diagram showing a notification example of the guidance information according to one example of the image display means according to the first embodiment of the present disclosure. The arrow shown in FIG. 4, which is one example of the guidance information, indicates the direction in which the user should proceed. It is needless to say that the image display means may display the return route.

Further, the direction display means or the image display means may display, along with the guidance direction, the most recent traveling direction of the user who carries the guidance apparatus 1. Further, the direction display means or the image display means may rotate the guidance direction or the traveling direction in accordance with the rotation of the guidance apparatus 1.

Further, the generator 134 updates the guidance information based on the current position measured by the positional information measurement unit 11 in the guidance mode and the first return route. That is, the generator 134 updates the guidance information to the latest guidance information every time the current position is measured in the guidance mode, that is, every time the positional information indicating the current position is updated. Then the output unit 14 notifies the user of the guidance information after the update via the output unit 14.

Further, the detector 131 determines whether the current position measured in the guidance mode is a position on the first return route. That is, the detector 131 determines whether the current position is deviated from the first return route. Specifically, the calculator 135 first performs a predetermined vector operation using at least one first motion vector and at least one second motion vector. The at least one first motion vector is a vector based on the traveling direction among a plurality of positions measured by the positional information measurement unit 11 when the user has moved from the first deviation point to the guidance start point. Further, the at least one second motion vector is a vector based on the traveling direction among a plurality of positions measured by the positional information measurement unit 11 when the user has moved from the guidance start point to the current position. Specific examples of the first and second motion vectors will be explained later. Then the detector 131 determines whether the result of the vector operation satisfies a predetermined condition. The predetermined condition will also be explained later. When it is determined that the result of the vector operation does not satisfy the predetermined condition, the detector 131 detects that the current position measured in the guidance mode is deviated from the first return route.

In this case, the setting unit 133 sets the operation mode 123 in the storage unit 12 to the emergency mode. That is, the operation mode of the guidance apparatus 1 is switched from the guidance mode to the emergency mode. Further, in this case, the registration unit 132 registers the positional information 121 indicating the position last measured on the first return route among positions measured before the current position by the positional information measurement unit 11 in the storage unit 12 as the deviation point 124 (second deviation point). That is, the second deviation point is a point at which deviation from the first return route has been started. Then the generator 134 generates a second return route to track back the moving path when the user has moved from the second deviation point to the current position. Further, the generator 134 generates the guidance information (the second guidance information) based on the current position and the second return route. It can be said that the second deviation point is the last point at which the guidance apparatus 1 has been determined to be positioned on the return route.

After that, the notification unit 136 notifies the user of the guidance information s2 that has been generated via the output unit 14. At the same time, the notification unit 136 outputs the emergency notification to the external apparatus via the transmitter 15. The transmitter 15 transmits the emergency notification signal s3 to the external apparatus in accordance with the output from the notification unit 136. Alternatively, the transmitter 15 may transmit the emergency notification signal s3 by mail or the like. The external apparatus is an information system capable of informing various related parties that the user needs an emergency rescue such as in a situation in which the user who carries the guidance apparatus 1 gets lost or stays in a dangerous place upon receiving the emergency notification signal s3. When the mode has switched to the emergency mode, the output unit 14 may, for example, emit a warning sound or blink an LED light.

Further, when the controller 13 sets the operation mode 123 to the monitor mode or the guidance mode, the controller 13 changes the measurement interval in the positional information measurement unit 11 to an interval shorter than that in the normal mode. For example, the controller 13 may make a change so that the measurement is performed for every ten seconds in the normal mode, the measurement is performed for every five seconds in the monitor mode, and the measurement is performed for every three seconds in the guidance mode. The measurement interval in the monitor mode may be the same as the measurement interval in the guidance mode or the measurement interval in the guidance mode may be shorter than the measurement interval in the monitor mode. It is therefore possible to grasp the current position in more detail and to support the user to return to the proper route as safe as possible. Further, from the aforementioned discussion, it can be said that the controller 13 causes the positional information measurement unit 11 to measure the positional information indicating the current position of itself at predetermined intervals.

Based on the aforementioned discussion, it can be said that the controller 13 determines at least whether the current position is a position on the proper route and generates first guidance information for guiding the user from the guidance start point, which is a point determined not to be a position on the proper route, to the first deviation point, which is one point determined to be a position on the proper route. Further, the controller 13 may preferably set, when the current position is away from the proper route by the first distance or larger, this position to be the guidance start point, set the last point that has been determined to be a position on the proper route as the first deviation point, and generate information for guiding the user to track back the route from the guidance start point to the first deviation point as the first guidance information.

<Operation Examples of Guidance Apparatus>

Figure 5:
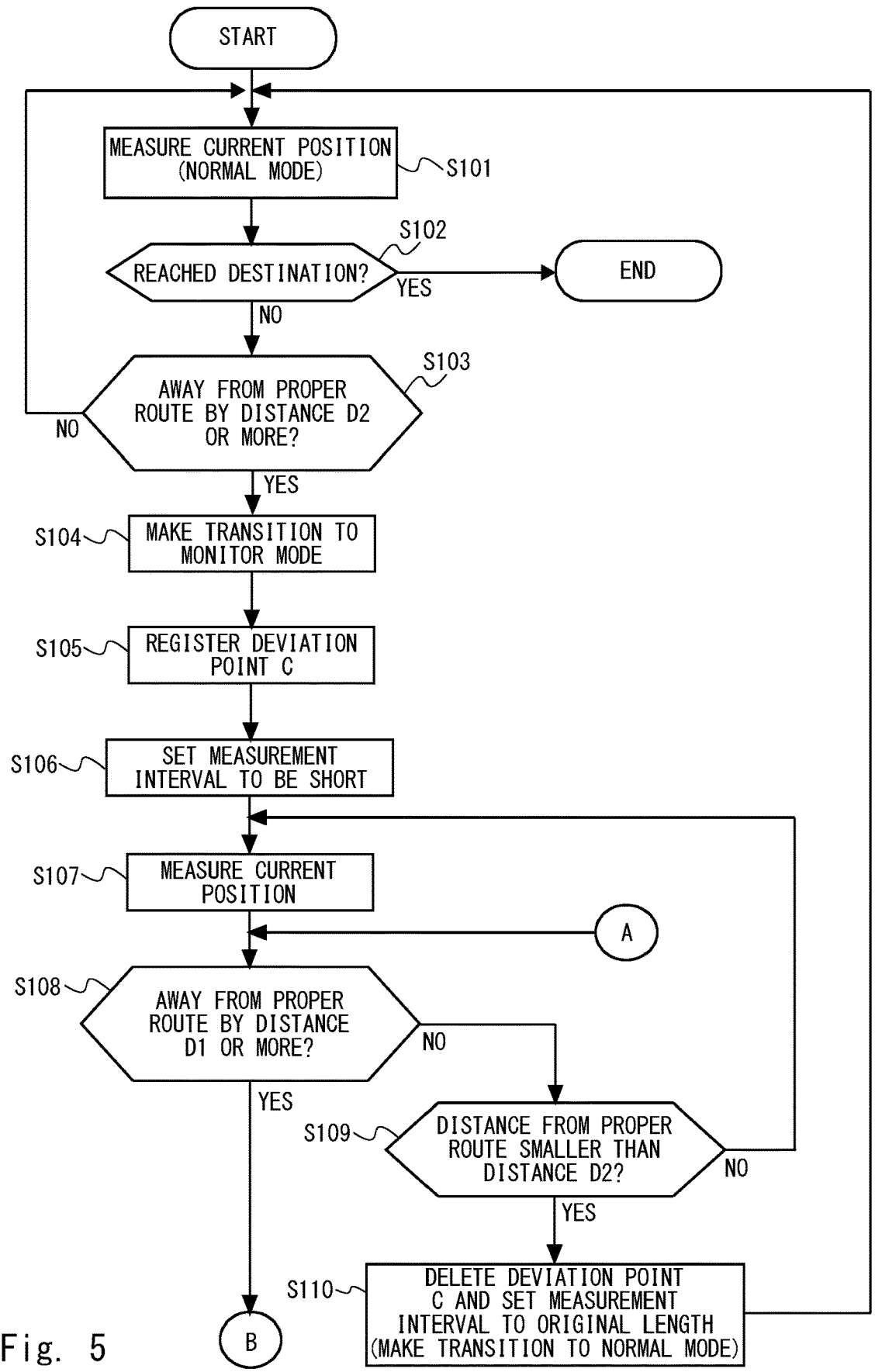
FIG. 5 is a flowchart for describing a flow of guidance processing according to the first embodiment of the present disclosure.
Figure 6:
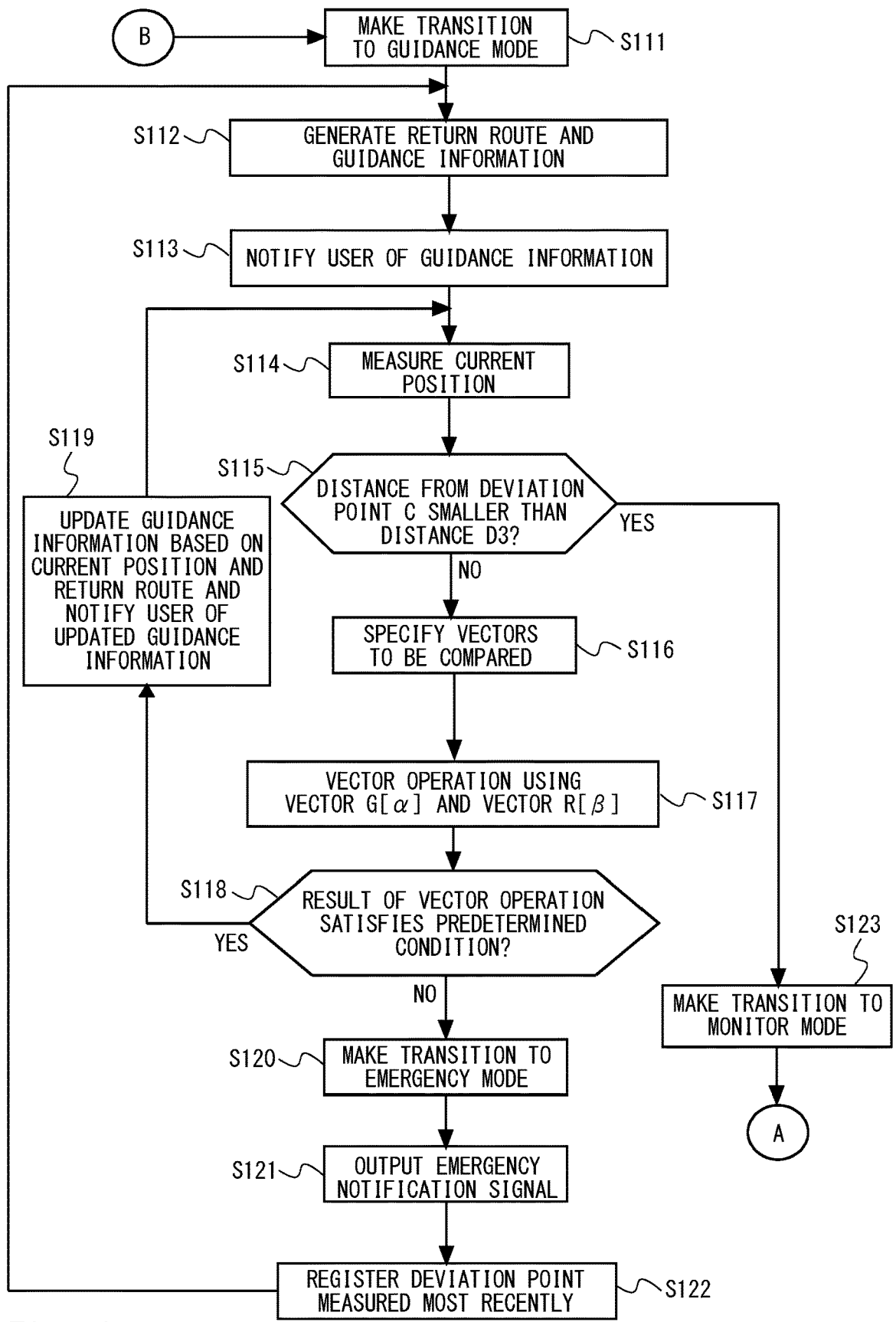
FIG. 6 is a flowchart for describing the flow of guidance processing according to the first embodiment of the present disclosure.

One example of operations of processing the guidance apparatus 1 according to the first embodiment including the aforementioned configuration will be explained. FIGS. 5 and 6 are flowcharts for describing the flow of guidance processing according to the first embodiment of the present disclosure. It is assumed that the proper route 122, the operation mode 123, the distance threshold 125, and the guidance program 126 are stored in the storage unit 12. It is further assumed that the operation mode 123 is set to the normal mode when the operation starts. It is assumed that the user who carries the guidance apparatus 1 starts moving from a departure place S to a destination Q in the proper route 122.

First, the positional information measurement unit 11 measures the current position when the measurement timing arrives at a predetermined interval (S101). In this case, since the operation mode 123 is the normal mode, it can be said that the monitor mode is in the OFF state.

Next, the detector 131 determines whether the current position is the destination Q, that is, whether the user has reached the destination Q (S102). When it is determined that the user has reached the destination Q, the guidance processing is ended. On the other hand, when it is determined that the user has not yet reached the destination Q, the detector 131 determines whether the current position is away from the proper route 122 by the distance D2 or larger (S103). When the user is moving along the proper route 122 to some extent, it is determined that the current position is away from the proper route 122 by a distance smaller than the distance D2. In this case, the process goes back to Step S101. On the other hand, when it is determined that the current position is away from the proper route 122 by the distance D2 or larger, the process goes to Step S104 and the following steps.

Figure 7:
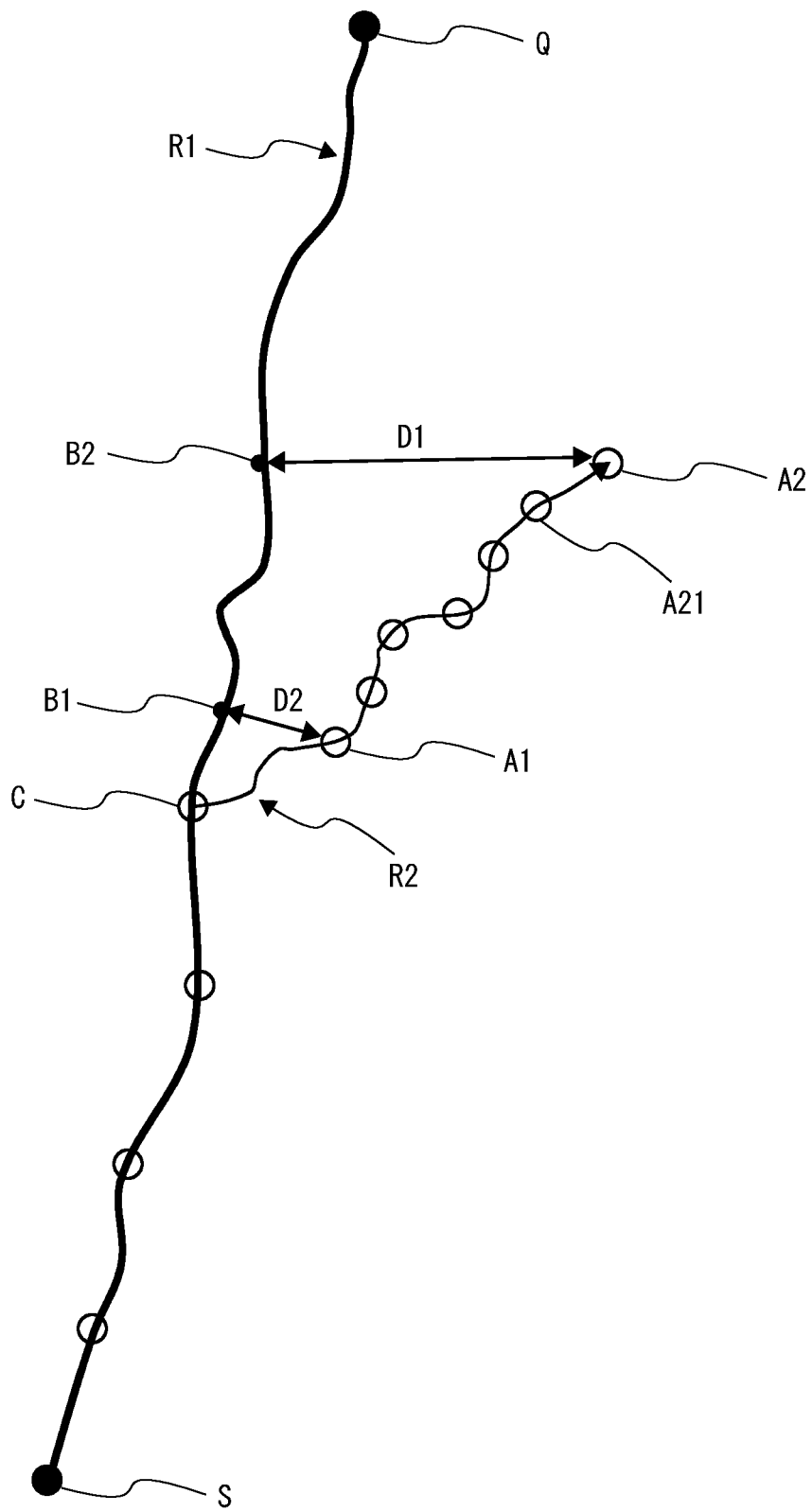
FIG. 7 is a diagram showing an example of a case in which a user is deviated from a proper route according to the first embodiment of the present disclosure.

FIG. 7 is a diagram showing an example in which the user has deviated from the proper route according to the first embodiment of the present disclosure. In FIG. 7, a proper route R1 is one example of the proper route 122 and is a path that the user should pass when the user moves from the departure place S to the destination Q. Further, white circles in FIG. 7 indicate the measurement positions measured by the positional information measurement unit 11. That is, it shows the points at which the guidance apparatus 1 has actually passed. In this example, from the departure place S to the deviation point C, it is determined to be NO in Step S103, and Steps S101 to S103 are repeated. When a point A1 is measured as the current position, the detector 131 calculates the distance between the point A1 and a point B1 as the shortest distance between the point A1 and the proper route R1 and determines that this distance is the distance D2 or larger. Therefore, it is determined to be YES in Step S103.

Then the setting unit 133 sets the operation mode 123 in the storage unit 12 to the monitor mode. It can also be said that the monitor mode becomes the ON state. Then, the registration unit 132 registers the positional information indicating the deviation point C measured immediately before the point A1, which is the current position, in the storage unit 12 as the deviation point 124 (S105). Then the controller 13 sets the measurement interval to become shorter than that in the normal mode in the positional information measurement unit 11 (S106).

After that, the positional information measurement unit 11 measures the current position in accordance with the measurement interval whose setting has been changed (S107). Then the detector 131 determines whether the current position is away from the proper route 122 by the distance D1 or larger (S108). In the example shown in FIG. 7, since the distance from the proper route 122 to the point measured next to the point A1 is still smaller than the distance D1, it is determined to be NO in Step S108. Then the detector 131 determines whether the distance between the current position and the proper route 122 is smaller than the distance D2 (S109). In the example shown in FIG. 7, since the distance from the proper route 122 to the point measured next to the point A1 is equal to or larger than the distance D2, it is determined to be NO in Step S109. In this case, Steps S107 to S109 are repeated until the time a point A2 is measured. A deviation route R2 in FIG. 7 is a passage route when the guidance apparatus 1 has actually moved from the deviation point C to the point A2.

After that, when the point A2 has been measured as the current position, the detector 131 calculates the distance between the point A2 and a point B2 as the shortest distance between the point A2 and the proper route R1 and determines that this distance is equal to or larger than the distance D1. Therefore, it is determined to be YES in Step S108. The condition that the shortest distance between the current position and the proper route is D1 (first distance) or larger is included in the condition that the distance between the current position and the proper route is equal to or larger than a predetermined value.

Then the setting unit 133 sets the operation mode 123 in the storage unit 12 to the guidance mode (S111). It can also be said that the guidance mode becomes the ON state.

Figure 8:
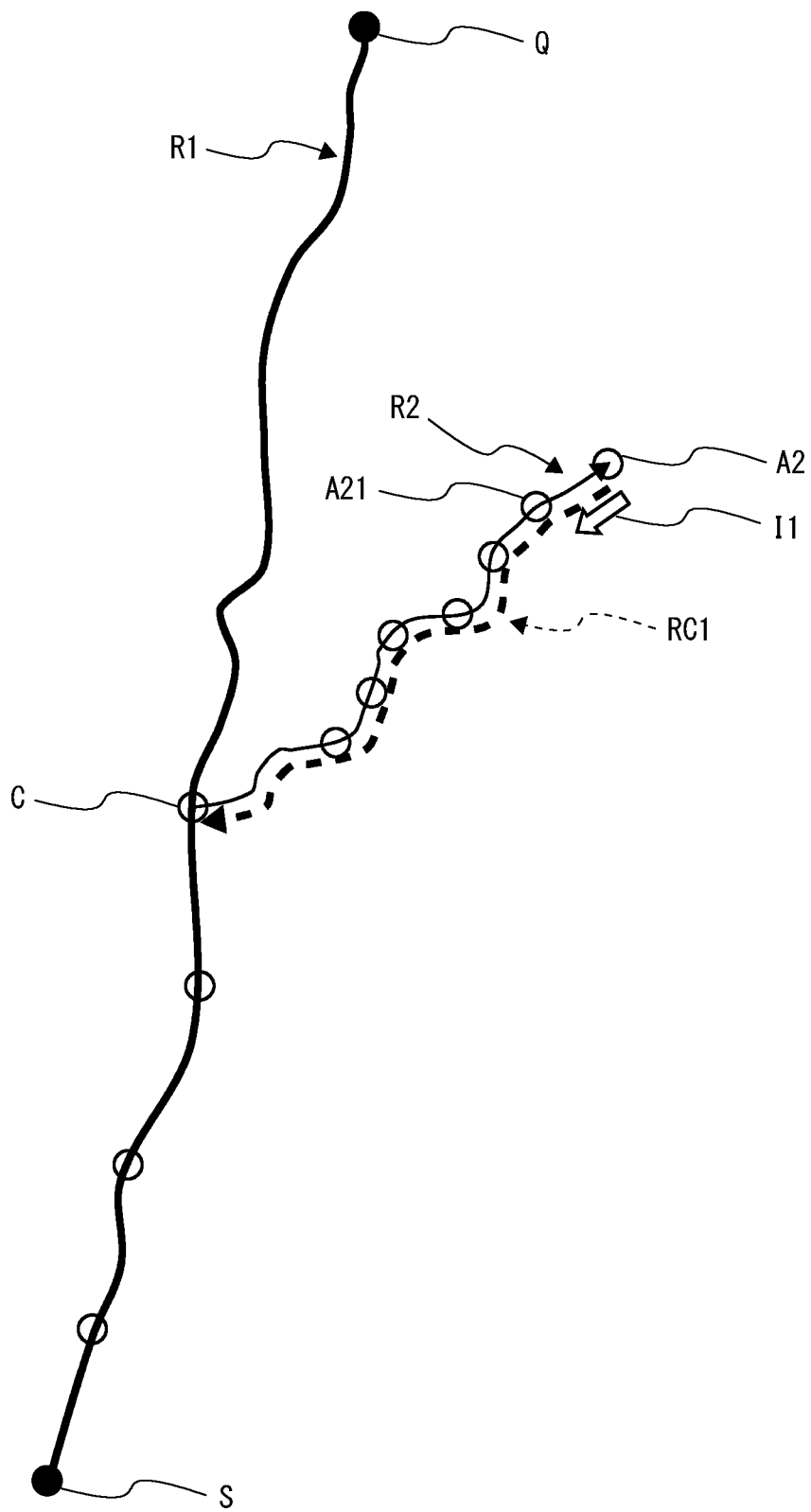
FIG. 8 is a diagram showing an example of a first return route and the guidance information according to the first embodiment of the present disclosure.

Next, the generator 134 generates the first return route and the first guidance information (S112). Specifically, the generator 134 refers to the storage unit 12 and specifies that the deviation point 124 is the deviation point C. Further, the generator 134 sets the point A2, which is the current position, as the guidance start point. Then the generator 134 generates the guidance path from the point A2 to the deviation point C as the first return route in such a way that the respective points that the user has actually passed from the deviation point C to the point A2 are associated with each other in the opposite direction, that is, in such a way that the user tracks back the points that the user has actually passed. Then the generator 134 generates information indicating the direction toward a point A21, which is a point the user should pass next to the point A2, which is the guidance start point, of the first return route, as the guidance information. Then the notification unit 136 notifies the user of the guidance information that has been generated (S113). FIG. 8 is a diagram showing an example of first return route RC1 and guidance information I1 according to the first embodiment of the present disclosure. The guidance information I1 is information for guiding the user to the direction from the point A2 to the point A21, and may be a direction other than the direction from the point A2 to the deviation point C. The guidance information I1 can be generated using a vector whose direction of a first motion vector G[m] that will be explained later is changed by 180 degrees and the guidance information I1 is generated based on G[1]. Further, the first return route RC1 may not be displayed on the screen of the guidance apparatus 1. That is, the first return route RC1 itself may not necessarily be output as the guidance information. The guidance information sent at this time may be, for example, information indicating the direction from the point A2 to the point A21 or the like. Further, other examples of the guidance information may be the aforementioned ones shown in FIGS. 2 to 4, but are not limited thereto.

After that, the user restarts the movement based on the guidance information that has been sent. Then the positional information measurement unit 11 measures the current position in accordance with the measurement interval in the guidance mode (S114). Next, the detector 131 determines whether the current position is a position whose distance from the deviation point C is smaller than the distance D3 (S115). It is assumed that the distance D3 is a value at least smaller than the distance D1. Therefore, at this stage, it is determined to be NO in Step S115.

Now, a method of detecting that the current position is deviated from the first return route in the guidance mode will be exemplified. First, at the timing when the mode is switched to the guidance mode, the storage unit 12 stores at least the positional information 121 from the deviation point C to the point A2. Further, the positional information 121 is added every time the measurement timing comes after the mode is switched to the guidance mode. Accordingly, the guidance apparatus 1 can be recognized as being a vector whose length is the distance between positional information pieces adjacent to each other in the time series and direction is the traveling direction. The motion vector in which positional information pieces in the monitor mode are associated with each other in the direction along the time series is denoted by a first motion vector G[m] (m is an integer equal to or larger than one). Further, the motion vector in which positional information pieces adjacent to each other in the guidance mode are associated with each other in the direction along the time series is denoted by a second motion vector R[n] (n is an integer equal to or larger than one).

Figure 9:
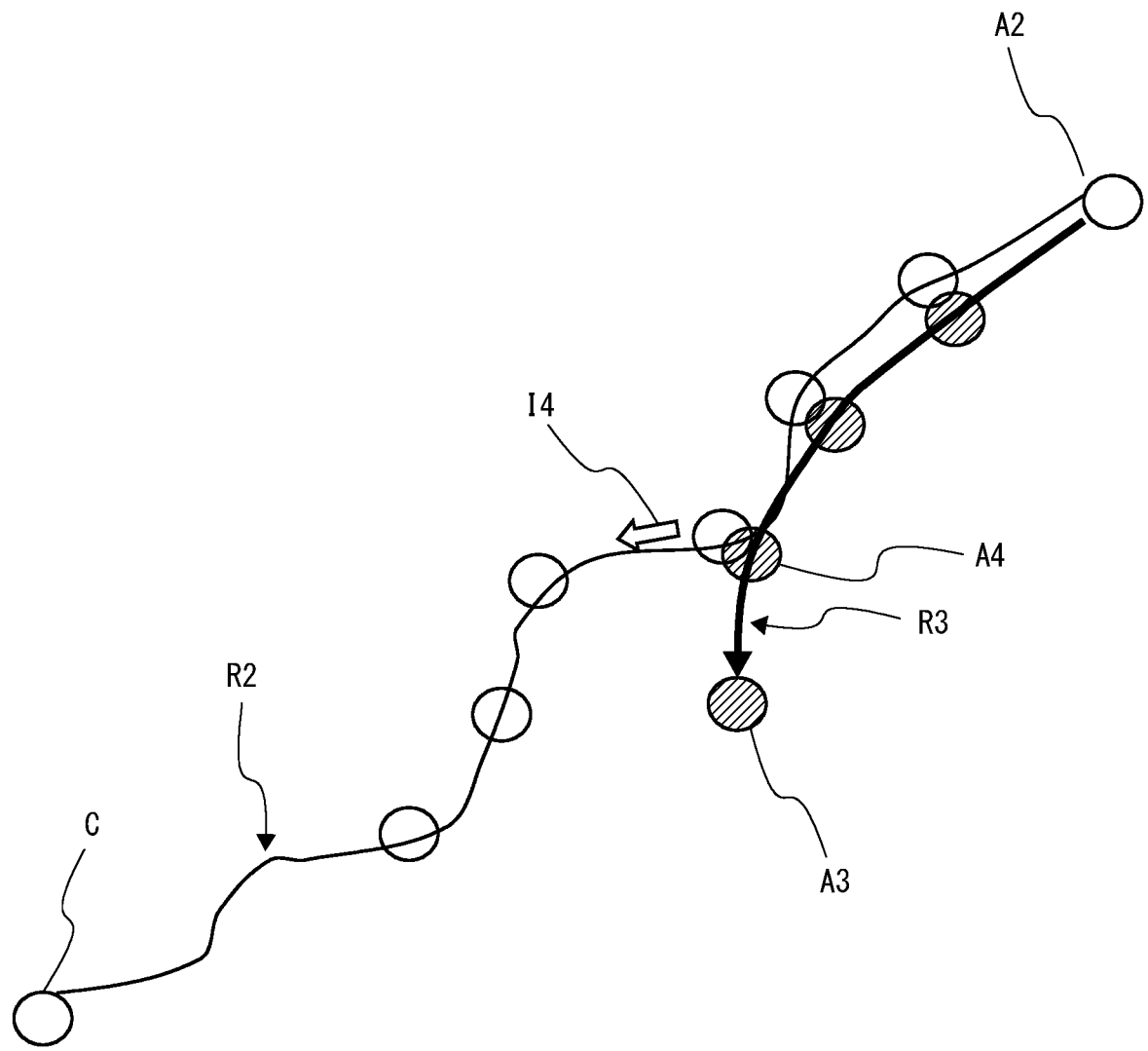
FIG. 9 is a diagram showing an example of a case in which the user is deviated from the first return route in the middle of returning from a guidance start point according to the first embodiment of the present disclosure.
Figure 10:
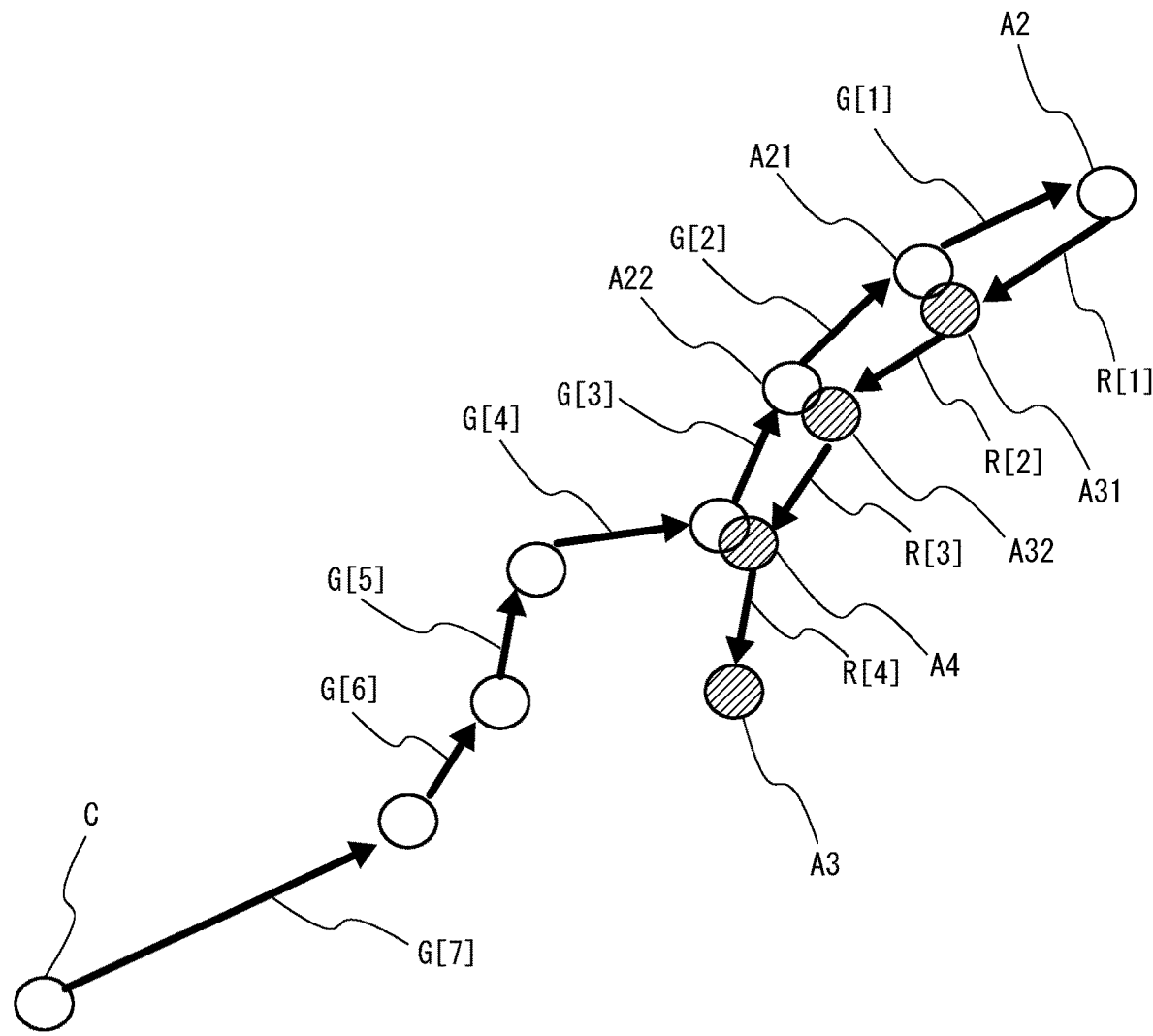
FIG. 10 is a diagram showing an example of motion vectors in a deviation route and the first return route.

FIG. 9 is a diagram showing an example of a case in which the guidance apparatus 1 is deviated from the first return route in the middle of returning from the guidance start point according to the first embodiment of the present disclosure. FIG. 9 shows that the user has moved from the point A2 to a point A3 via a point A4 in the guidance mode. Guidance information I4 is an example of the guidance information that has been sent at the point A4. The passing route R3 is a route that the user has actually passed. In this example, the passing route R3 is a deviation route. Further, FIG. 10 is a diagram showing an example of motion vectors in the deviation route and the first return route. In this example, the first motion vectors correspond to G[1] to G[7] from the vectors close to the point A2, which is the guidance start point, in series. The second motion vectors correspond to R[1] to R[4] from the vectors close to the point A2, which is the guidance start point, in series. While the total number of vectors G is defined, the number of vectors R increases until the operation mode is switched to the normal mode.

Referring back to FIG. 6, an explanation will be continued. In Step S116, the calculator 135 specifies vectors to be compared. Specifically, the calculator 135 specifies the index number m of the first motion vector G[m] and the index number n of the second motion vector R[n]. The index number m specified in this step is expressed by α and the index number n specified in this step is expressed by β. First, when a point A31 is measured in Step S114, the calculator 135 specifies vectors R[1] and G[1] as vectors to be compared, where m=1 and n=1. The first motion vector selected to be a vector to be compared most recently is referred to as a "guidance reference vector". In this example, G[1] is the first guidance reference vector.

Next, when the current position has moved to A32, a second motion vector R[2] with A31 as a start point and A32 as an end point is generated. Then the first motion vector, which is the target to be compared with R[2], is specified. It is determined, for example, whether the current position (A32) is on the side of the end point (A2) of the guidance reference vector or whether it is on the side of a start point (A22) of a first motion vector (G[2]) immediately before the guidance reference vector temporally based on the start point (A21) of the guidance reference vector (G[1]). When the current position (A32) is on the side of the start point (A22) of the first motion vector (G[2]) immediately before the guidance reference vector temporally, the first motion vector immediately before the guidance reference vector temporally is set to a new guidance reference vector. When the current position (A32) is on the side of the end point (A2) of the guidance reference vector, the guidance reference vector is not updated. In the examples shown in FIG. 10, A32 is present on the side of A22 with respect to A21. Therefore, the guidance reference vector is updated and G[2] is set to be the new guidance reference vector. Then R[2] and G[2] are specified to be the vectors to be compared.

The aforementioned method of specifying the vectors to be compared is merely one example, and a method other than that described above may be used. For example, a nearest neighbor position (A22) whose distance from the current position (A32) is the closest may be specified from among the positional information pieces in the guidance mode, and the first motion vector (G[2]) with the nearest neighbor position (A22) as a start point may be set to be the guidance reference vector.

Figure 11A:
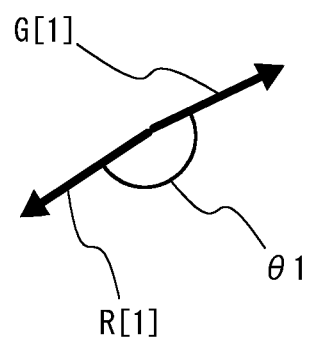
FIG. 11A and FIG. 11B are diagrams showing an example of an angle formed by a vector G and a vector R.

Next, the calculator 135 performs the vector operation using the vectors to be compared specified in Step S116 (S117). It is assumed that the vectors to be compared specified in Step S116 are m=α, n=β and one example of the vector operation may be an operation of calculating the angle formed by a vector G[α] and a vector R[β]. FIG. 11A is a diagram showing an example of the angle formed by the vector G and the vector R when α=1 and β=1. The calculator 135 calculates, for example, an angle θ1 to the vector R[1] clockwise based on the vector G[1]. Then the detector 131 determines whether the angle θ1, which is the result of the vector operation, satisfies a predetermined condition (S118).

The predetermined condition may be, for example, that the angle formed by the vector R and the vector G is within a range from 160 to 200 degrees. Therefore, when the angle is θ1, it is determined that the predetermined condition is satisfied and it is determined to be YES in Step S118. That is, in this case, the current position measured in the guidance mode is not deviated from the first return route. Therefore, the guidance mode is continued.

After that, the generator 134 updates the guidance information based on the current position and the first return route and notifies the user of the updated guidance information (S119). The generator 134 updates, for example, information indicating the direction from a point A31, which is the current position, to the point A22 that the user has actually passed in the monitor mode, as the guidance information. Alternatively, in a simpler way, the guidance information may be information in which the direction of the vector G[2] from the point A22 to the point A21 is changed by 180 degrees. Then the process goes back to Step S114. In the following process, the current position is measured in the order of the points A32, A4, and A3, and Steps S114 to S119 are repeated.

Figure 11B:
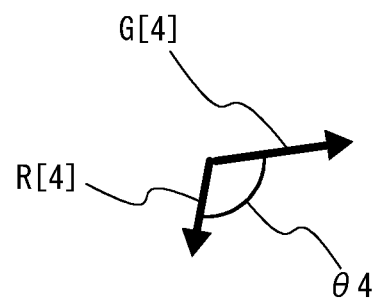

A case in which the point A3 has been measured as the current position will be explained. First, it is assumed that the point A3 is a point away from the deviation point C by the distance D3 or larger (NO in S115) and the calculator 135 specifies vectors R[4] and G[4] as the vectors to be compared. Then the calculator 135 calculates an angle θ4 formed by the vector R[4] and the vector G[4] (S117, FIG. 11B). Since the angle θ4 is not within the range from 160 to 200 degrees, it is determined to be NO in Step S118.

After that, the setting unit 133 sets the operation mode 123 in the storage unit 12 to the emergency mode (S120). It can also be said that the emergency mode becomes the ON state.

Next, the notification unit 136 outputs the emergency notification signal s3 via the transmitter 15 (S121). Then the registration unit 132 registers positional information indicating the point A4 last measured on the first return route, the point A4 being measured prior to the measurement of the point A3, which is the current position, in the storage unit 12 as the deviation point 124 (second deviation point) (S122). Then the process goes back to Step S112.

Figure 12:
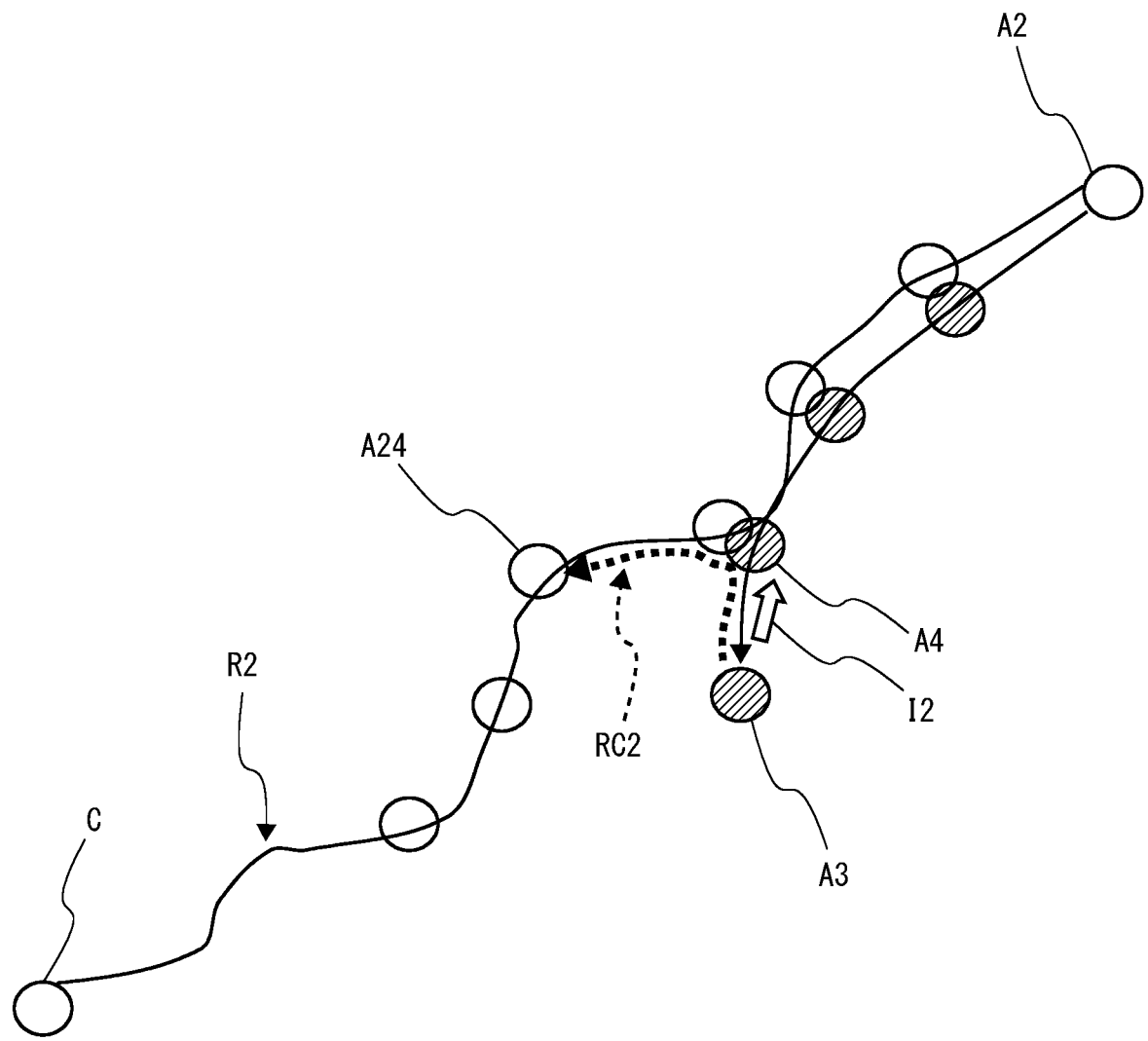
FIG. 12 is a diagram showing an example of a second return route when the user is deviated from the first return route.

In this example, the generator 134 generates the second return route and the second guidance information (S112). FIG. 12 is a diagram showing an example of the second return route when the user has deviated from the first return route. Specifically, the generator 134 refers to the storage unit 12 and specifies that the deviation point 124 is the deviation point A4. Further, the generator 134 sets the point A3, which is the current position, to be the guidance start point. Then the generator 134 generates the path from the point A3 to the deviation point A4 in such a way as to track back the moving path when the user has moved from the deviation point A4 to the point A3. Further, the generator 134 generates the path from the deviation point A4 to the point A24, which is the next waypoint, based on the first deviation route. FIG. 12 shows an example in which the user passes the points A3-A4 and the path to the point A24 is set to be a second return route RC2. The second return route may further connect the path from the point A24 to the deviation point C of the first return route. Then the generator 134 generates information indicating the direction from the point A3, which is the guidance start point of the second return route, to the point A4 that the user should pass next as the second guidance information. Then the notification unit 136 notifies the user of the second guidance information that has been generated (S113). Guidance information I2 in FIG. 12 is one example of the guidance information sent at the point A3. Alternatively, in place of the guidance information I2, the second return route RC2 itself may be set as the guidance information at the point A3.

In the following processing, Steps S114 to S119 or Steps S112 to S122 are repeated until the current position is determined to be a position whose distance from the deviation point C is smaller than the distance D3. That is, every time the user is deviated from the latest return route, the return route and the guidance information to let the user go back to the most recent deviation point are generated again and sent to the user.

Figure 13:
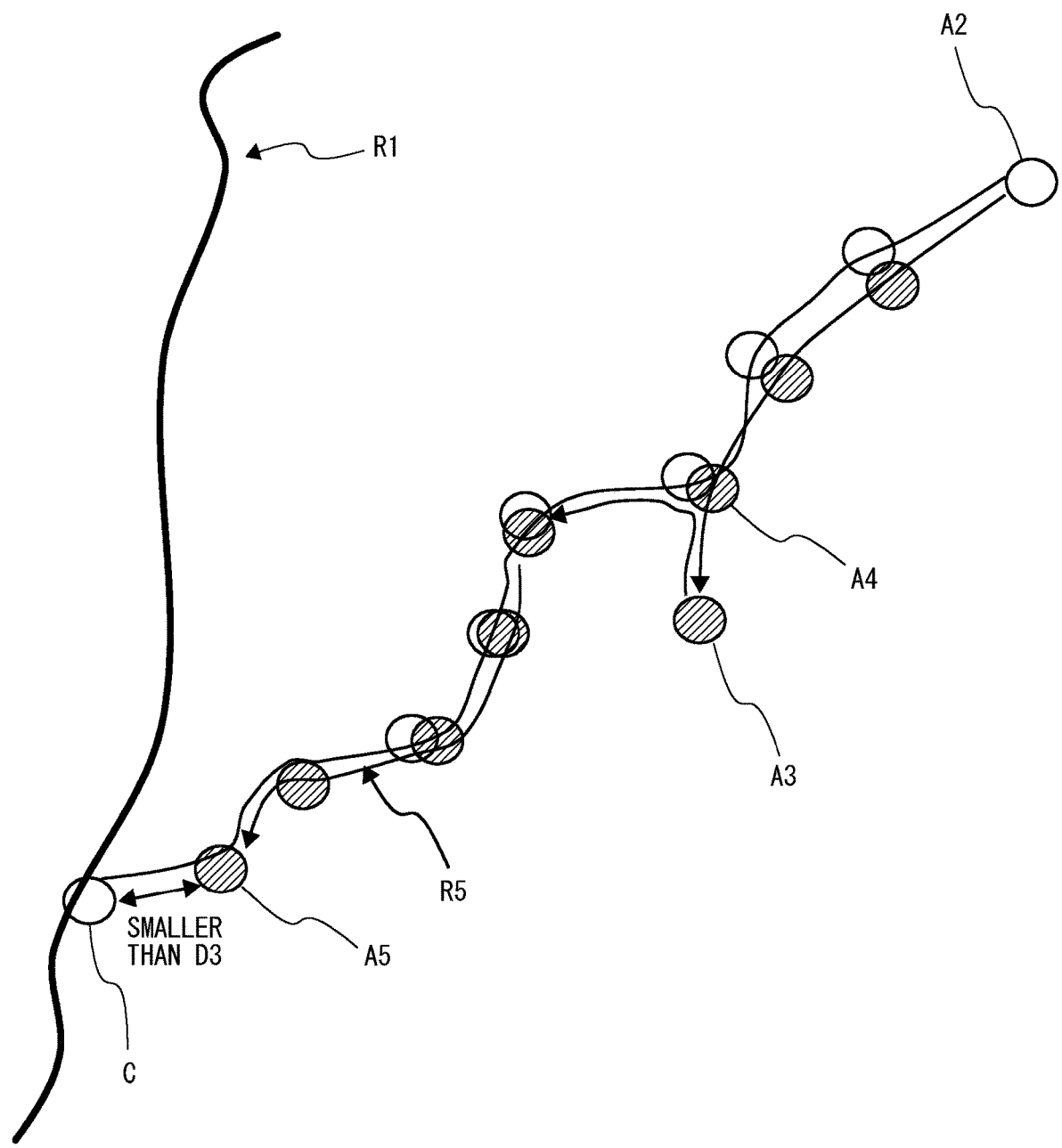
FIG. 13 is a diagram showing an example of a case in which the user has returned to a position whose distance from a deviation point is smaller than a distance D3.

After that, when it is determined that the current position is a position whose distance from the deviation point C is smaller than the distance D3 (YES in S115), the setting unit 133 cancels the setting of the guidance mode and the emergency mode of the operation mode 123 in the storage unit 12 and sets the mode to the monitor mode (S123). In this case, the registration unit 132 deletes deviation points other than the deviation point C from the deviation point 124 in the storage unit 12. FIG. 13 is a diagram showing an example of a case in which the user has returned to a position whose distance from the deviation point is smaller than the distance D3. This example shows that the guidance apparatus 1 has actually passed a passing route R5 and has reached a point A5. This example further shows that the point A5 is a position whose distance from the deviation point C is smaller than the distance D3.

When it is determined to be YES in Step S115, since the distance D3 is shorter than the distance D1, it is then determined in Step S108 that the point A5, which is the current position, is a position whose distance from the proper route R1 is smaller than the distance D1 (NO in S108). When it is assumed that the distance D3 is shorter than the distance D2, it is then determined that the point A5 is a position whose distance from the proper route R1 is smaller than the distance D2 (YES in S109). Then, in Step S110, the registration unit 132 deletes the deviation point C from the deviation point 124 in the storage unit 12. Further, the controller 13 sets the measurement interval to the original length in the positional information measurement unit 11. That is, the controller 13 sets the measurement interval to be longer than the measurement interval in the monitor mode. Further, in this case, the setting unit 133 sets the operation mode 123 in the storage unit 12 to the normal mode. Then the process goes back to Step S101. In Step S123, processing that corresponds to Step S110 may be executed and the mode may be switched to the normal mode, and then the process may go back to Step S101 from Step S123.

In this embodiment, when the mode has switched to the monitor mode and then the user goes back to the proper route by himself/herself without the mode being switched to the guidance mode as well, the mode may be set to the normal mode. This case corresponds to the case in which the process flow of Step S107, NO in S108, and YES in S109 in FIG. 5 is executed.

Figure 14:
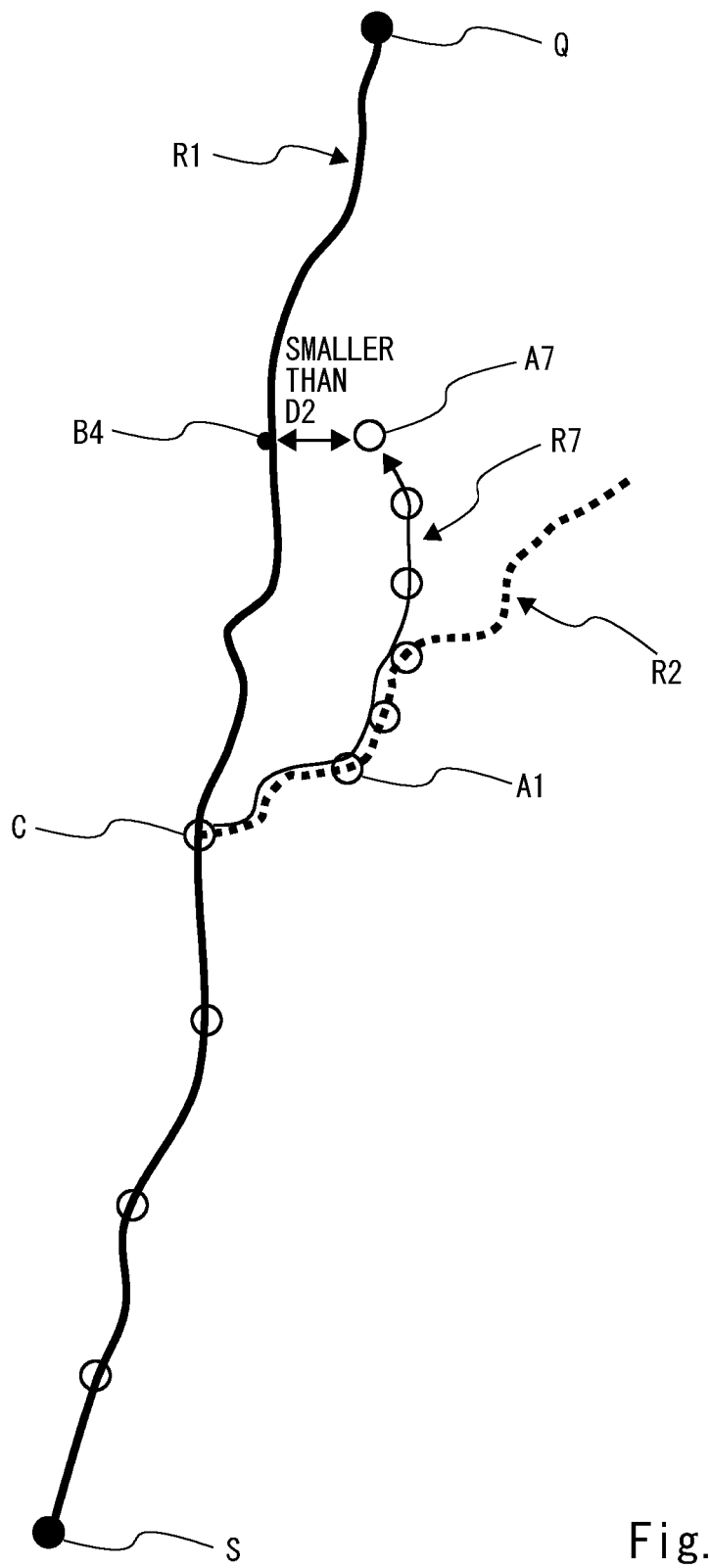
FIG. 14 is a diagram showing an example of a case in which the user has deviated from the proper route by a distance D2 or larger but smaller than a distance D1 and then reached a position whose distance from the proper route is smaller than the distance D2.

For example, FIG. 14 is a diagram showing an example of a case in which user has deviated from the proper route by the distance D2 or larger but smaller than the distance D1 and then reached a position whose distance from the proper route is smaller than the distance D2. That is, FIG. 14 shows a state in which while the mode is the monitor mode at the point A1, the user then passed a deviation route R7 and reached a point A7. In this case, since the deviation route R7 is always in a position whose distance from the proper route R1 is smaller than the distance D1, it is always determined to be NO in Step S108.

When the controller 13 has detected that the distance of the current position (point A7) measured in the monitor mode from the proper route has become smaller than the distance D2 (YES in S109), the controller 13 cancels the setting of the monitor mode and deletes the deviation point C from the storage unit 12 (S110). It is therefore possible to prevent an excessive number of warning signals from being sent to the user or processing from being performed excessively.

From the aforementioned discussion, according to this embodiment, when the user is deviated from the proper route, the user is guided to return to the path the user has actually passed from the deviation point to the current position by tracking back the path that the user has passed, whereby it is possible to safely guide the user to the deviation point.

In a normal city area or the like, for example, the route obtained by connecting the point A2 and the point B2 by a straight line in FIG. 7 is the optimal return route to return to the proper route. In an environment such as in a mountain, a wilderness, a snowfield, or on ice in which roads are unclear, however, the straight route from the point A2 to the point B2 may not be an appropriate route. This is because, since there may be an obstacle such as a cliff, valley, river, crevasse in the middle of the straight route from the point A2 to the point B2, there is no guarantee that the user can actually pass this straight route. Even in the city area or the like, in an environment in which mines may be buried or a bomb or the like may be placed or an environment in which the security level is low, it is desirable that the user does not pass unknown routes. That is, when the safety of points other than the proper route has not been confirmed although the safety of the proper route is confirmed, it is desirable that the user return to the last passing point (deviation point C) on the proper route from the point A2 by tracking back the route that the user has actually passed. Alternatively, when there is a point safer than the deviation point C among the points on the proper route that the user has passed, the points being close to the deviation point C, it is desirable that the user go back to this point. It can be said that the route that the user has actually passed before is safer than other routes even when the safety of the route that the user has actually passed is not confirmed in advance at the time of the departure. Further, since the user is guided to pass the point the user has passed relatively recently (the point that looks familiar to the user), the user is able to proceed with no worry, whereby it is possible to prevent a situation in which the user becomes mentally confused since the user does not know the place and thus the user further gets lost.

Further, in this embodiment, a notification is not always sent to the user immediately when the user has deviated from the proper route R1 to some extent (the distance D2). This is because, in this case, there is a low risk and there is a high possibility that the user will be able to go back to the proper route R1 by himself/herself. It is therefore possible to prevent an excessive number of notifications from being sent. On the other hand, in this state, the mode is switched to the monitor mode, in which the monitoring is performed in such a way that the user does not part from the proper route R1 by the distance D1 or larger so that the user is able to return to the proper route R1.

Further, in this embodiment, when the user is deviated from the proper route R1 and proceeds along the deviation route R2, the deviation point C is specified at the stage of the point A1 and is recorded. Therefore, in the point A2 that has proceeded from the deviation route R2 to some extent as well, the deviation point C can be immediately specified as the point from which the user can safely return to the proper route R1. Further, the positional information from the deviation point C to the point A2 is also recorded, whereby it is possible to immediately generate the first return route and to guide the user by the guidance information.

Furthermore, in this embodiment, when the user is deviated also from the first return route, the last waypoint in the first return route is set to be the second deviation point and the path from the current position to the first deviation point via the second deviation point is generated as the second return route. Then the user is guided to first return to the second deviation point from the current position. Then, after the user has safely returned to the second deviation point, the user is guided to proceed to the first deviation point from the second deviation point. When the user is deviated also from the second return route, in a similar way, the last waypoint in the second return route may be set to a third deviation point and the path from the current position to the second deviation point via the third deviation point is generated as a third return route. By repeating this process, the user is able to safely return to the original point every time the user is deviated from the guided route no matter how many times the user is deviated from the guided route.

As described above, in this embodiment, in an environment in which the safety of only the proper route is confirmed, when the user goes back to the proper route after the user has deviated from the proper route, as long as the user returns the route the user has proceeded on so far, it is possible to guide the user to a relatively safe route without emitting an emergency notification signal. When the user goes back to the proper route after the user has deviated from the proper route, if the user proceeds on a route other than the route the user has proceeded on so far, it is determined that there is a high risk. In this case, an emergency notification signal is emitted so that it becomes possible to provide assistance for the rescue of the user.

The user tends to intentionally proceed on a route other than the first return route to take a short cut even when it is possible to track back the route the user has proceeded on so far. However, in this embodiment, since the user knows that the emergency notification signal is emitted, it is possible to prevent the user from intentionally deviating from the first return route.

Modified Example

This embodiment may employ the following modified example. In the aforementioned description, when the result of the predetermined vector operation does not satisfy the predetermined condition (that is, when the current position is deviated from the first return route) in the guidance mode (NO in S118 in FIG. 6), the mode immediately switches to the emergency mode (S120 in FIG. 6). Alternatively, the number of times that it is determined to be NO in Step S118 may be counted and the process may proceed to Step S120 and the following processing when it is determined to be NO for N (N is an integer equal to or larger than two) consecutive times. Alternatively, the process may proceed to Step S120 and the following processing depending on the total number of times that it is determined to be NO in Step S118. It is therefore possible to guide the user to the return route while preventing an excessive number of notifications from being emitted.

Second Embodiment

In a second embodiment of the present disclosure, another example of the vector operation by the calculator 135 and the determination method by the detector 131 will be explained. First, in Step S117 in FIG. 6, the calculator 135 calculates the inner product of the vector G[α] and the vector R[β]. Then, in Step S118, the detector 131 determines whether the calculated inner product satisfies a predetermined condition, that is, whether this inner product is a negative value and the absolute value thereof is a fixed value or more. It can be said that in this method, the condition that the traveling direction of the deviation route R2 and that of the first return route RC1 are substantially opposite to each other and the condition that the traveling speed in the deviation route R2 and that in the first return route RC1 are relatively fast are comprehensively determined.

In Step S117 in FIG. 6, as described in the first embodiment, the calculator 135 may calculate the angle formed by the vector G[α] and the vector R[β]. Then, in Step S118, the condition that the angle formed by the two vectors is within a predetermined range and the condition that the traveling speed in the first return route RC1 is a predetermined value or larger may be comprehensively determined by the detector 131.

Third Embodiment

In a third embodiment, which is a modified example of the first embodiment, a determination condition of the angle formed by the first motion vector and the second motion vector is that allowance of a displacement in the direction opposite to a side of the proper route is smaller than allowance of a displacement to the side of the proper route with respect to the traveling direction of the first return route.

In the case shown in FIGS. 8 and 10, for example, the proper route R1 is on the right side with respect to the traveling direction of the first return route RC1. In this case, when the detector 131 determines the angle formed by the vector G[α] and the vector R[β], the detector 131 increases the allowance of the displacement in the right direction with respect to the traveling direction of the first return route and decreases the allowance of the displacement in the left direction with respect to the traveling direction of the first return route. When the angle is indicated in a clockwise direction based on the vector G[α], for example, a range from 170 to 210 degrees is set to be a predetermined range.

Accordingly, even when the user is deviated from the first return route, it is possible to prevent dangers in advance by detecting the case in which the user is further deviated from the proper route more rapidly. On the other hand, even when the user is deviated from the first return route, if the guidance apparatus 1 is deviated from the first return route toward the proper route, this means that the user approaches the proper route. In this case, the user's movement can be allowed to some extent, whereby it is possible to prevent an excessive number of warning signals from being emitted and prevent the user from tracking back the route again, whereby it is possible to shorten the returning time.

Fourth Embodiment

A fourth embodiment is a modified example of the first to third embodiments and the value of the distance D1 is changed depending on situations. That is, the controller 13 changes the first distance in accordance with an elapsed time which has elapsed after the user started tracking the proper route, a moving distance after the user has departed, or a period of time to which the current time belongs.

For example, such a control that the distance D1 is made relatively large when the elapsed time which has elapsed after the departure is within three hours, the distance D1 is made to an intermediate level when the elapsed time is from three hours to six hours, and the distance D1 is made relatively small when the elapsed time is six hours or larger may be performed. This is because as more time elapses after the departure, the user's fatigue accumulates and thus there is a high possibility that the user may make a wrong decision when deciding the path to proceed on. By performing this control, when the elapsed time which has elapsed after the departure or the moving distance from the departure has become long, the guidance can be started earlier, whereby the safety level can be further improved. Alternatively, as an example of performing control depending on the period of time, the distance D1 may be made relatively large in the morning where there is much time before sunset, the distance D1 may be set to an intermediate level from the early afternoon to the late afternoon, and the distance D1 may be made relatively small during the night. Alternatively, the first distance may be changed in accordance with a condition in which two or more factors of the elapsed time which has elapsed after the user starts tracking the proper route, the moving distance, and the period of time are combined with each other. When, for example, "the elapsed time which has elapsed after the departure is within three hours and at the same time the current time is before noon", the distance D1 may be made relatively large, and when "the elapsed time which has elapsed after the departure is within six hours and at the same time the current time is before 3 p.m.", the distance D1 may be set to an intermediate level. When neither one of the aforementioned two conditions is satisfied, the distance D1 may be made relatively small. As a matter of course, a condition in which three factors are combined with one another may be used. That is, the distance D1 may be set (changed) in accordance with at least one of factors of the elapsed time which has elapsed after the user started tracking back the proper route, the moving distance, and the period of time. The "at least one of factors of the elapsed time, the moving distance, and the period of time" indicates one or more of "only the elapsed time", "only the moving distance", "only the period of time", "the elapsed time and the moving distance", "the elapsed time and the period of time", "the moving distance and the period of time", and "the elapsed time, the moving distance, and the period of time".

Fifth Embodiment

A fifth embodiment is a modified example of the first to fourth embodiments, and the condition used in Step S115 of FIG. 6 is replaced by a condition whether the current position is a position whose distance from the proper route is smaller than the distance D3. That is, when the controller 13 has detected that the shortest distance between the current position measured in the guidance mode and the proper route has become smaller than the distance D3 (YES in S115), the controller 13 cancels the setting of the guidance mode (S123) and deletes the deviation point C from the storage unit 12 (S110).

Figure 15:
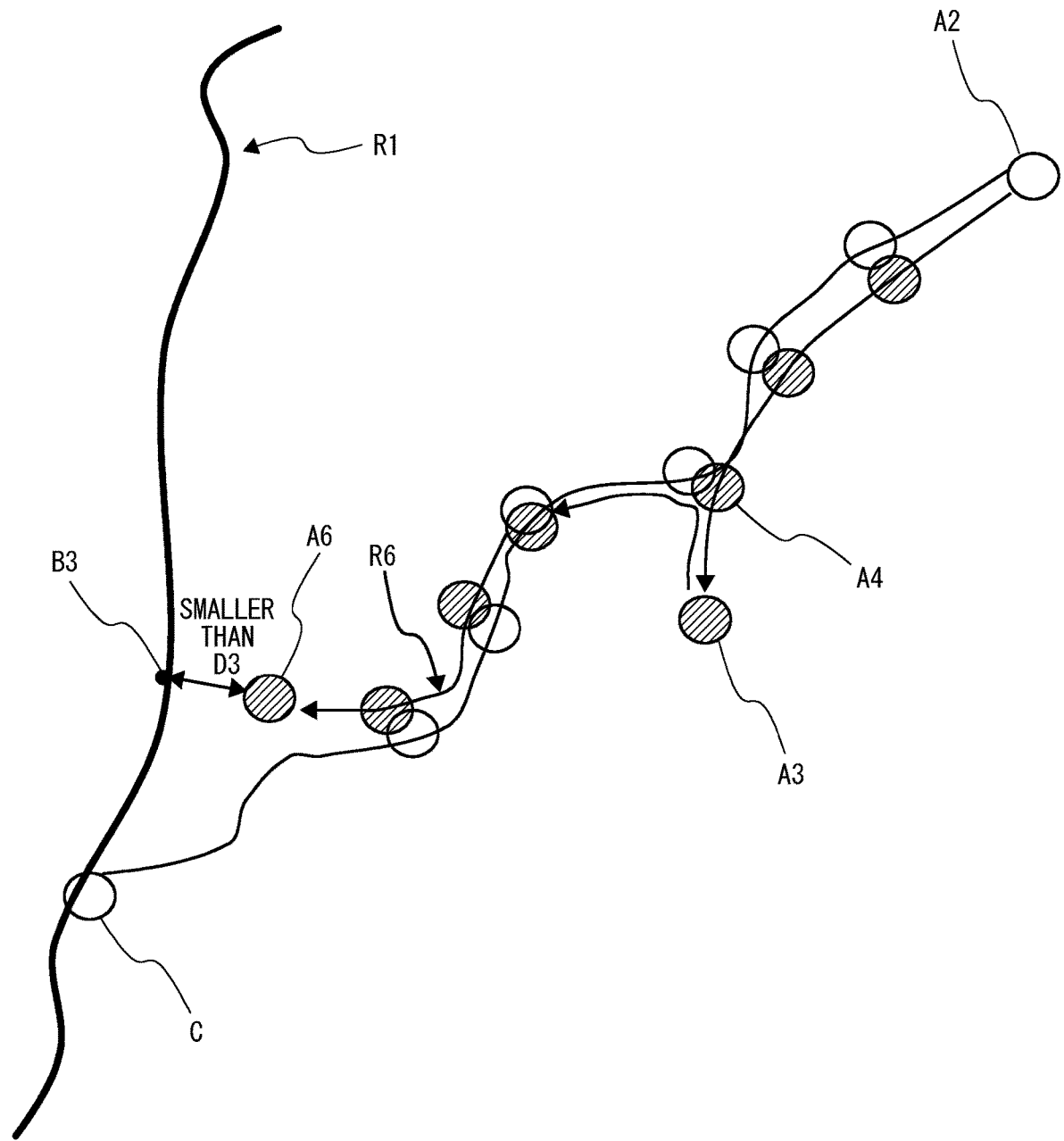
FIG. 15 is a diagram showing an example of a case in which the user has returned to a position whose distance from the proper route is smaller than the distance D3.

FIG. 15 is a diagram showing an example in which the user has returned to a position whose distance from the proper route is smaller than the distance D3. This example indicates that the user is moving along the return route as shown in a passing route R6. This example indicates that while a point A6 is somewhat deviated from the return route, the distance between the point A6 and a point B3 on the proper route R1 is smaller than the distance D3. That is, even when the user is deviated from the return route while the user is returning along the return route, if the user has successfully reached a position whose distance from the proper route is within a predetermined range and if this point is relatively close to the proper route, the user is able to safely go back to the proper route even when the user does not return to the deviation point C. It is therefore possible to prevent the mode from switched to the emergency mode excessively while ensuring security.

Sixth Embodiment

A sixth embodiment is a modified example of the first to fifth embodiments, and it is determined in Step S108 in FIG. 5 "whether the current position is away from the proper route by the distance D1 or larger, or whether the current position is away from the deviation point C by the distance D4 or larger". Alternatively, it is determined "whether the current position is away from the deviation point C by the distance D4 or larger". That is, the controller 13 sets the mode to the guidance mode, generates the first return route, and notifies the user of the first guidance information based on the current position and the first return route also in the case in which it is detected that the current position measured in the monitor mode is away from the deviation point C by the distance D4 (fourth distance) or larger. The condition that the distance between the current position and the deviation point C is the distance D4 (fourth distance) or larger is included in the condition that the distance between the current position and the proper route is the predetermined value or larger.

Figure 16:
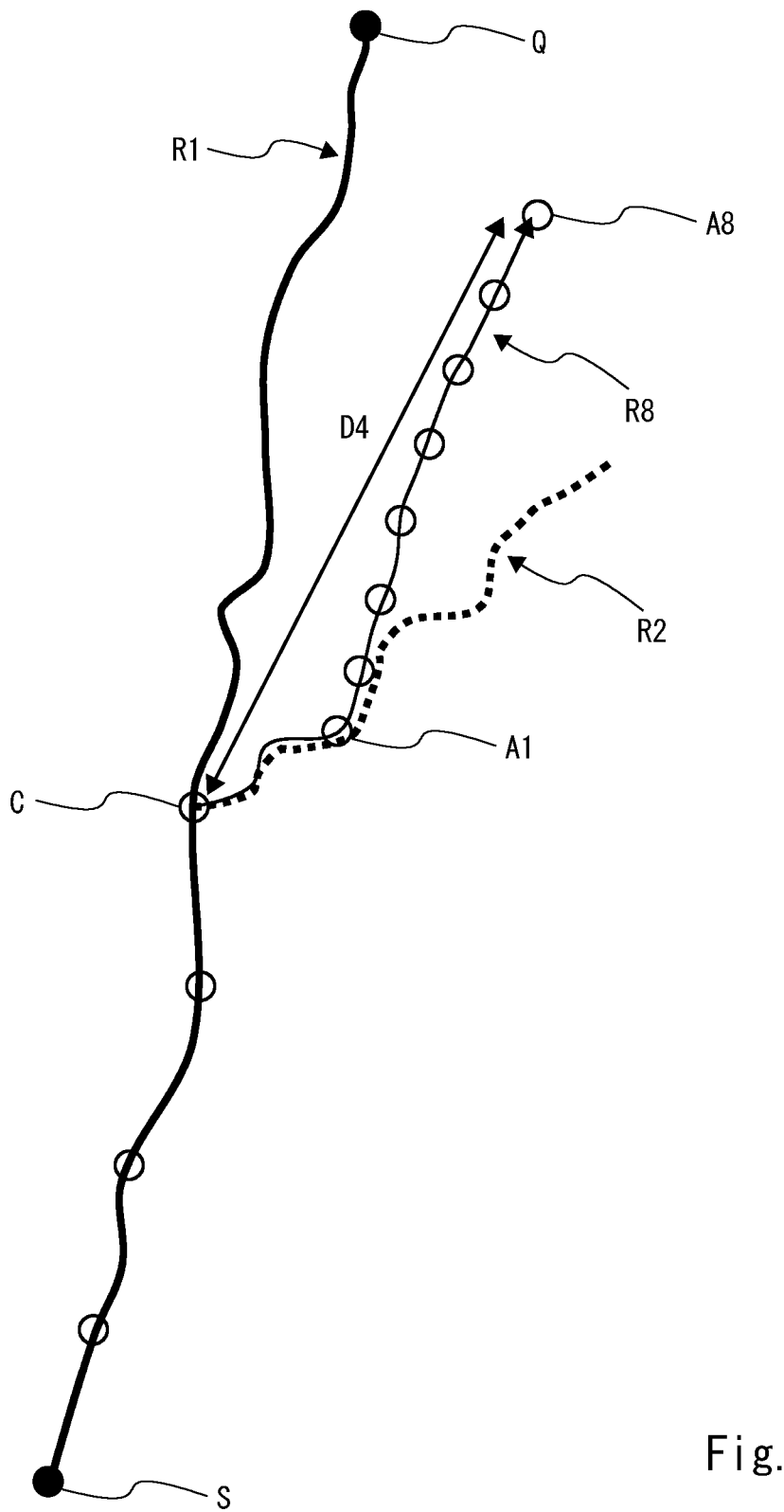
FIG. 16 is a diagram showing an example of a case in which the user is deviated from the proper route by the distance D2 or larger and then deviated from the deviation point by a distance D4 or larger while keeping the distance from the proper route to be smaller than the distance D1.

FIG. 16 is a diagram showing an example in which the user is deviated from the proper route by the distance D2 or larger and then the user is deviated from the deviation point by the distance D4 or larger while the distance from the proper route is being kept to be smaller than the distance D1. That is, this example shows the case in which the mode is switched to the monitor mode at the point A1 and after that the user has passed a deviation route R8 and reached a point A8. It can be said that there is a high risk if this state continues for a long time. In this case, even when the distance from the proper route is smaller than the distance D1, the mode is switched to the guidance mode when the point A8 is away from the deviation point C by the distance D4 or larger, whereby it is possible to safely guide the user to the deviation point C, similar to the operation in the first embodiment.

Other Embodiments

While the present disclosure has been described above with reference to the embodiments, it is needless to say that the embodiments are not limited to the aforementioned configurations and may include various changes, modifications, or combinations that may be made by one ordinary skilled in the art within the scope of the claims of the present disclosure.

Arbitrary processing of the aforementioned guidance apparatus may be achieved by causing a Central Processing Unit (CPU) to execute a computer program. In this case, the computer program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Further, besides a case in which the functions of the aforementioned embodiments are achieved by the computer executing the program achieving the functions of the aforementioned embodiments, a case in which this program achieves the functions of the aforementioned embodiments in collaboration with an Operating System (OS) or an application software operating on the computer is also within the scope of the embodiments. Further, a case in which a part or all of the processing of this program is performed by a function expansion board inserted into the computer or a function expansion unit connected to the computer and the functions of the aforementioned embodiments are thereby achieved is also within the scope of the embodiments.

According to the embodiments, it is possible to provide the guidance apparatus, the guidance method, and the guidance program for safely guiding the user to the proper route when the user is deviated from the proper route.

The first, second, third, fourth, fifth and sixth embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A guidance apparatus comprising:
at least one processor;
a positional information measurement receiver periodically measuring a position of the guidance apparatus at a predetermined measurement interval based on a received positional signal;
a storage storing a proper route and storing a plurality of measured positions in a first order that each position is measured, the positions being measured by the positional information measurement receiver and indicating sequential positions that the guidance apparatus has passed;
an output device; and
at least one memory coupled to the processor, the memory storing instructions that when executed by the processor cause the processor to:
determine whether a current position of the guidance apparatus measured by the positional information measurement receiver is a position on the proper route,
set, when the current position is not a position on the proper route and is away from the proper route by a first distance threshold or larger, the current position to be a first return start point,
specify a first deviation point which is a previously measured position of the guidance apparatus that the guidance apparatus has passed prior to the current position and which is a most recent position determined to be a position on the proper route by referring to the storage, and
generate a first return route from the first return start point to the first deviation point, wherein
the first return route comprises positions that the guidance apparatus has passed prior to the current position in a section from the first deviation point to the first return start point,
the output device outputs information about the first return route by using a direction indication by a voice guide, a direction indication by an electronic compass, a direction indication by lighting some of a plurality of LEDs arranged in a ring form, or a display of a map, and
the instructions further cause the processor to specify each of the positions that the guidance apparatus has passed prior to the current position in the section from the first deviation point to the first return start point by referring to the storage, and generate a route, as the first return route, from the first return start point to the first deviation point through each of the specified positions,
wherein the instructions further cause the processor to set the first distance threshold to become a smaller value as an amount of time elapsed from a start of movement of the guidance apparatus in the proper route increases, as a distance that the guidance apparatus has moved along the proper route becomes longer, or as an amount of time until sunset is shorter.

2. The guidance apparatus according to claim 1, wherein the instructions further cause the processor to:
set the current position to be a second return start point and specify a second deviation point which is a most recent position determined to be a position on the first return route when an emergency state in which the current position measured by the positional information measurement receiver is deviated from the first return route has been detected;
generate a second return route from the second return start point to the second deviation point; and
further output an emergency notification to an external apparatus, wherein
the output device outputs information about the second return route using the direction indication by the voice guide, the direction indication by the electronic compass, the direction indication by lighting some of the plurality of LEDs arranged in a ring form, or the display of the map, and
the second return route is a route where the guidance apparatus re-passes each of the positions that the guidance apparatus has passed prior to the current position in a section from the second deviation point to the second return start point in a third order opposite to the first order when the guidance apparatus has passed each of the positions.

3. The guidance apparatus according to claim 2, wherein the instructions further cause the processor to:
generate at least one first motion vector based on the plurality of positions measured by the positional information measurement receiver when the guidance apparatus has moved from the first deviation point to the first return start point and at least one second motion vector based on the plurality of positions measured by the positional information measurement receiver after the first return route is generated;
calculate an angle formed by the first motion vector and the second motion vector; and
detect the emergency state when the angle does not satisfy a predetermined condition.

4. The guidance apparatus according to claim 1, wherein the instructions further cause the processor to specify a nearest point that is closest to the current position of the guidance apparatus among the positions where the guidance apparatus has passed in the section from the first deviation point to the first return start point and set a direction from the current position to the nearest point to be a guidance direction, and
the output device outputs the guidance direction using the direction indication by the voice guide, the direction indication by the electronic compass, the direction indication by lighting some of the plurality of LEDs arranged in a ring form, or an arrow indication on the map.

5. The guidance apparatus according to claim 1, wherein the instructions further cause the processor to set one point where the guidance apparatus has passed in the section from the first deviation point to the first return start point to be a start point, generate at least one motion vector that uses a point where the guidance apparatus has passed after it has passed the one point as an end point, and set a direction opposite to the direction of the motion vector to be a guidance direction, and
the output device outputs the guidance direction using the direction indication by the voice guide, the direction indication by the electronic compass, the direction indication by lighting some of the plurality of LEDs arranged in a ring form, or the arrow indication on the map.

6. The guidance apparatus according to claim 1, wherein the instructions further cause the processor to determine that the current position is a position on the proper route when a distance between the current position of the guidance apparatus and the proper route is less than a second distance threshold which is smaller than the first distance threshold, determine that the current position is not a position on the proper route when the distance is the second distance threshold or larger, and control, when it is determined that the current position is not a position on the proper route, the positional information measurement receiver so as to make the predetermined measurement interval shorter.

7. The guidance apparatus according to claim 1, wherein the instructions further cause the processor to determine whether the traveling direction of the guidance apparatus matches the first return route and wherein the output device outputs alarm sound with different frequencies depending on the determined result.

8. A guidance method performed by a guidance apparatus, the guidance method comprising:
periodically measuring a position of the guidance apparatus at a predetermined measurement interval based on a received positional signal;
storing a plurality of measured positions in a first order that each position is measured, the positions being the measured positions and indicating sequential positions where the guidance apparatus has passed;
determining whether the measured current position of the guidance apparatus is a position on the proper route;
setting, when the current position is not a position on the proper route and is away from the proper route by a first distance threshold or larger, the current position to be a first return start point and specifying a first deviation point which is a previously measured position of the guidance apparatus that the guidance apparatus has passed prior to the current position and which is a most recent position determined to be a position on the proper route;
generating a first return route from the first return start point to the first deviation point, the first return route comprising positions that the guidance apparatus has passed prior to the current position in a section from the first deviation point to the first return start point; and
outputting information about the first return route by using a direction indication by a voice guide, a direction indication by an electronic compass, a direction indication by lighting some of a plurality of LEDs arranged in a ring form, or a display of a map, wherein
the first return route is a route from the first return start point to the first deviation point through each of the positions that the guidance apparatus has passed prior to the current position in the section from the first deviation point to the first return start point,
wherein the instructions further cause the processor to set the first distance threshold to become a smaller value as an amount of time elapsed from a start of movement of the guidance apparatus in the proper route increases, as a distance that the guidance apparatus has moved along the proper route becomes longer, or as an amount of time until sunset is shorter.

9. A non-transitory computer readable medium storing a program for causing a computer of a guidance apparatus to execute the following processing of:
periodically acquiring a position of the computer at a predetermined measurement interval based on a received positional signal;
storing a plurality of measured positions in a first order that each position is measured, the positions being the measured positions and indicating sequential positions that the guidance apparatus has passed;
determining whether the acquired current position of the guidance apparatus is a position on the proper route;
setting, when the current position is not a position on the proper route and is away from the proper route by a first distance threshold or larger, the current position to be a first return start point and specifying a first deviation point which is a previously measured position of the guidance apparatus that the guidance apparatus has passed prior to the current position and which is a most recent position determined to be a position on the proper route;
generating a first return route from the first return start point to the first deviation point, the first return route comprising positions that the guidance apparatus has passed prior to the current position in a section from the first deviation point to the first return start point; and
outputting information about the first return route by using a direction indication by a voice guide, a direction indication by an electronic compass, a direction indication by lighting some of a plurality of LEDs arranged in a ring form, or a display of a map, wherein the first return route is a route from the first return start point to the first deviation point through each of the positions that the guidance apparatus has passed prior to the current position in the section from the first deviation point to the first return start point, wherein the instructions further cause the processor to set the first distance threshold to become a smaller value as an amount of time elapsed from a start of movement of the guidance apparatus in the proper route increases, as a distance that the guidance apparatus has moved along the proper route becomes longer, or as an amount of time until sunset is shorter.

* * * * *